(12) United States Patent
Fishter et al.

(10) Patent No.: US 12,478,076 B2
(45) Date of Patent: *Nov. 25, 2025

(54) COFFEE COMPOSITION AND ITEMS MADE THEREFROM

(71) Applicant: THE FOLGER COFFEE COMPANY, Orrville, OH (US)

(72) Inventors: Steven G. Fishter, Wooster, OH (US); Stephen J. Westerkamp, Medina, OH (US); Jennifer Marie Sabo, Brecksville, OH (US); Tracy May Adair, Copley, OH (US); Jessalin Anise Howell, Mason, OH (US); Michael Joe Steven Vaughan, Wooster, OH (US)

(73) Assignee: THE FOLGER COFFEE COMPANY, Orrville, OH (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/438,126

(22) Filed: Feb. 9, 2024

(65) Prior Publication Data
US 2024/0180186 A1 Jun. 6, 2024

Related U.S. Application Data

(63) Continuation of application No. 16/541,978, filed on Aug. 15, 2019, now Pat. No. 11,896,025.

(60) Provisional application No. 62/752,097, filed on Oct. 29, 2018, provisional application No. 62/739,674, filed on Oct. 1, 2018.

(51) Int. Cl.
*A23F 5/12* (2006.01)
*A23F 5/38* (2006.01)
*A23F 5/40* (2006.01)

(52) U.S. Cl.
CPC .............. *A23F 5/125* (2013.01); *A23F 5/385* (2013.01); *A23F 5/405* (2013.01)

(58) Field of Classification Search
CPC ........... A23F 5/125; A23F 5/385; A23F 5/405
See application file for complete search history.

(56) References Cited

U.S. PATENT DOCUMENTS

| 1,641,446 A | 9/1927 | Mccoll |
| 1,723,069 A | 8/1929 | Pauly |

(Continued)

FOREIGN PATENT DOCUMENTS

| CA | 2360453 A1 | 1/2002 |
| DE | 2811353 | 9/1979 |

(Continued)

OTHER PUBLICATIONS

Office action dated Jan. 30, 2024 in Canadian Application No. 3054399.

(Continued)

*Primary Examiner* — Katherine D Leblanc
(74) *Attorney, Agent, or Firm* — Michael A Olshavsky; Timothy D. Semmelroth

(57) ABSTRACT

A structured coffee composition and to various items made using such coffee composition are provided. The structured coffee composition is suitable for use in one or more of automatic drip coffee makers, single serving coffee makers, percolating coffee makers, moka pot coffee makers, French press coffee makers, vacuum coffee makers, expresso coffee makers, thermal coffee makers, or any combination of two or more thereof.

25 Claims, 14 Drawing Sheets

(56) References Cited

U.S. PATENT DOCUMENTS

| | | |
|---|---|---|
| 1,951,357 A | 3/1934 | Hall |
| 2,371,093 A | 3/1945 | Willison |
| 2,447,258 A | 8/1948 | Lobley |
| 3,121,635 A | 2/1964 | Eldred |
| 3,261,689 A | 7/1966 | Ponzoni |
| 3,607,299 A | 9/1971 | Bolt |
| 3,652,292 A | 3/1972 | Bach et al. |
| 3,660,107 A | 5/1972 | Mayer |
| 3,713,842 A | 1/1973 | Lubsen et al. |
| 3,769,031 A | 10/1973 | Mc Swiggin |
| 3,770,457 A | 11/1973 | Makwinski et al. |
| 4,474,821 A | 10/1984 | Morrison, Jr. et al. |
| 4,975,295 A | 12/1990 | Sierra |
| 5,064,676 A | 11/1991 | Gore |
| 5,227,188 A | 7/1993 | Leppla et al. |
| 5,725,898 A | 3/1998 | Murphy et al. |
| 5,776,527 A | 7/1998 | Blanc |
| 6,291,006 B1 | 9/2001 | Butterbaugh et al. |
| 6,379,737 B1 | 4/2002 | Butterbaugh et al. |
| 6,497,911 B1 | 12/2002 | Hansen et al. |
| 6,783,791 B2 | 8/2004 | Bunke et al. |
| 7,794,771 B2 | 9/2010 | Kessler |
| 8,389,036 B2 | 3/2013 | Diolaiti |
| 8,420,150 B2 | 4/2013 | Rubinstenn et al. |
| 8,541,042 B2 | 9/2013 | Robinson et al. |
| 8,734,692 B2 | 5/2014 | Branlard et al. |
| 8,900,648 B2 | 12/2014 | Bunke et al. |
| 9,155,319 B1 | 10/2015 | Perlman |
| 9,314,042 B2 | 4/2016 | Abaurre |
| 9,357,791 B2 | 6/2016 | Fountain et al. |
| 9,474,290 B2 | 10/2016 | Young |
| 9,474,291 B2 | 10/2016 | Young |
| 9,603,376 B2 | 3/2017 | Young |
| 9,756,869 B2 | 9/2017 | Young |
| 9,877,495 B2 | 1/2018 | Charles |
| 9,968,112 B2 | 5/2018 | Forny et al. |
| 10,004,249 B2 | 6/2018 | Castro et al. |
| 2005/0255202 A1 | 11/2005 | Dalziel et al. |
| 2006/0165845 A1 | 7/2006 | Kaku et al. |
| 2009/0175985 A1 | 7/2009 | Canham |
| 2010/0119685 A1 | 5/2010 | Van Bergen |
| 2013/0136843 A1 | 5/2013 | Blanc |
| 2014/0199441 A1 | 7/2014 | Liu |
| 2016/0037794 A1 | 2/2016 | Kang et al. |
| 2016/0120202 A1 | 5/2016 | Soquet et al. |
| 2016/0128348 A1 | 5/2016 | Massey et al. |

FOREIGN PATENT DOCUMENTS

| | | |
|---|---|---|
| EP | 0229920 B1 | 7/1987 |
| EP | 0220889 A2 | 7/1988 |
| EP | 0220889 A3 | 7/1988 |
| EP | 0220889 B1 | 7/1988 |
| EP | 0813816 B1 | 12/1997 |
| EP | 0928561 A1 | 7/1999 |
| EP | 1038445 B1 | 11/2002 |
| GB | 1186606 | 4/1970 |
| GB | 2006603 | 5/1979 |
| GB | 2533912 | 7/2016 |
| IE | 20000694 | 4/2001 |
| KR | 101799782 B1 | 11/2017 |
| WO | 01/34475 | 5/2001 |
| WO | 04/34798 | 4/2004 |
| WO | 09/81250 A2 | 7/2009 |
| WO | 09/81250 A3 | 7/2009 |
| WO | 15/19870 | 2/2015 |
| WO | 17/98002 | 6/2017 |

OTHER PUBLICATIONS

Office action dated Nov. 20, 2023 in Canadian Application No. 3054412.
Amendment filed Apr. 26, 2022 in response to Final Office Action dated Jan. 28, 2022 in U.S. Appl. No. 16/542,002.
Amendment filed May 6, 2022 in response to Final Office Action dated Mar. 7, 2022 in U.S. Appl. No. 16/541,978.
Amendment filed Oct. 8, 2021 in response to Office Action dated Jul. 8, 2021 in U.S. Appl. No. 16/542,002.
Amendment filed Sep. 11, 2023 in response to Final Office Action dated May 10, 2023 in U.S. Appl. No. 16/541,978.
Amendment filed Sep. 11, 2023 in response to Non-final Office Action dated May 10, 2023 in U.S. Appl. No. 16/542,002.
Amendment filed Sep. 21, 2022 in response to Office Action dated Jun. 22, 2022 in U.S. Appl. No. 16/541,978.
Amendment filed Sep. 21, 2022 in response to Office Action dated Jun. 22, 2022 in U.S. Appl. No. 16/5420002.
Election filed Apr. 19, 2021 in response to Office Action/Restriction Requirement dated Feb. 19, 2021 in U.S. Appl. No. 16/541,978.
Election filed Apr. 19, 2021 in response to Office Action/Restriction Requirement dated Feb. 19, 2021 in U.S. Appl. No. 16/542,002.
Final Office Action dated Jan. 28, 2022 in U.S. Appl. No. 16/542,002.
Final Office Action dated Mar. 7, 2022 in U.S. Appl. No. 16/541,978.
Final Office Action dated Oct. 6, 2022 in U.S. Appl. No. 16/541,978.
Final Office Action dated Oct. 6, 2022 in U.S. Appl. No. 16/542,002.
Non-final Office Action dated Aug. 6, 2021 in U.S. Appl. No. 16/541,978.
Non-final Office action dated Jul. 8, 2021 in U.S. Appl. No. 16/542,002.
Non-final Office Action dated Jun. 22, 2022 in U.S. Appl. No. 16/541,978.
Non-final Office Action dated Jun. 22, 2022 in U.S. Appl. No. 16/542,002.
Non-final Office Action dated May 10, 2023 in U.S. Appl. No. 16/541,978.
Non-final Office Action dated May 10, 2023 in U.S. Appl. No. 16/542,002.
Non-final Office Action/Restriction Requirement dated Feb. 19, 2021 in U.S. Appl. No. 16/541,978.
Non-final Office Action/Restriction Requirement dated Feb. 19, 2021 in U.S. Appl. No. 16/542,002.
Pre-Appeal Brief Request for Review filed Jan. 3, 2023 in response to Final Office Action dated Oct. 6, 2022 in U.S. Appl. No. 16/541,978.
Pre-Appeal Brief Request for Review filed Jan. 3, 2023 in response to Final Office Action dated Oct. 6, 2022 in U.S. Appl. No. 16/542,002.

COFFEE COMPOSITION AND ITEMS MADE THEREFROM

CROSS REFERENCE TO RELATED APPLICATIONS

This application is a continuation of and claims priority to U.S. Ser. No. 16/541,978, entitled COFFEE COMPOSITION AND ITEMS MADE THEREFROM, and filed Aug. 15, 2019, now U.S. Pat. No. 11,896,025, granted Feb. 13, 2024, which claims priority to and any benefit of both U.S. Provisional Application No. 62/739,674, entitled COFFEE COMPOSITION AND ITEMS MADE THEREFROM, and filed Oct. 1, 2018, and U.S. Provisional Application No. 62/752,097, entitled COFFEE COMPOSITION AND ITEMS MADE THEREFROM, and filed Oct. 29, 2018. The complete text of these patent applications is hereby incorporated by reference as though fully set forth herein in their entirety. This application is also related to U.S. Ser. No. 16/542,002, also entitled COFFEE COMPOSITION AND ITEMS MADE THEREFROM, and also filed Aug. 15, 2019, now U.S. Pat. No. 11,903,395, granted Feb. 20, 2024, which also claims priority to and any benefit of both of the foregoing provisionals, and the entire contents of which Ser. No. 16/542,002 is incorporated by reference herein.

FIELD OF THE INVENTION

The present invention relates to structured coffee compositions and to various items made using such coffee compositions. Further, the structured coffee compositions may be used in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

BACKGROUND

Automatic Drip Coffee makers ("ADCs") are designed for processing "ground roast coffee" or "coffee," i.e., granulated coffee obtained by grinding previously roasted coffee beans. Because of differences in flavor strength among different coffees, as well as variations in personal taste, consumers can find it difficult to determine the correct dose (amount) of coffee to use for brewing pots of different sizes.

Single serving coffee makers such as those by Hamilton Beach, Cuisinart, Mr. Coffee and others are generally designed to make a single cup of coffee (but can make slightly larger volumes) using a single use ground, or powered, coffee composition. In some instances, the coffee compositions used in connection with such single serving coffee makers can be powered in nature, in other instances the coffee compositions utilized in connection with such single serving coffee makers can be contained in what is typically viewed as a single use coffee "cup." In this instance, such a coffee "cup" container/structure can contain, but does not require, a built-in filter element that lines the inside surface of such a single "use" coffee cup container/structure. It should be noted that although such coffee cup containers/structures are viewed as single use, the end user or consumer can, and often does, use such single use coffee cups more than once. Other forms of coffee makers and methods for preparing coffee include, but are not limited to, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

To deal with this problem, a number of products have been introduced whereby various manufacturers provide coffee in standardized doses. For example, filter packs in which a predetermined amount of coffee, e.g., enough coffee to brew 4, 6, 8, 10 or 12 servings of brewed coffee, are provided in a filter paper container. However, this approach cannot be used for brewing one, or only a few, servings of coffee, as the consumer is required to make the amount of servings for which the filter pack is designed. In addition, it is difficult to change the strength of the brewed coffee.

In an alternate approach, single serving "containers," "cups," and/or "pods" have been provided in which enough ground roast coffee for brewing only a single serving is housed in a filter paper container. However, single serving pods must have a specific configuration to fit brewer(s) for which they are designed. Machines used to brew coffee with these pods are fundamentally different from automatic drip coffee makers. They are also limited to making a single cup at a time, which limits their usefulness in making larger amounts of brewed coffee.

A further approach combines the idea of a single cup brew is found in products such as Folgers® coffee singles. These can be made with mixtures of instant and ground roast coffee. While they do not have to fit a particular brewer, they still are really only designed to brew a single cup of coffee.

In still another approach, separate "tablets" are provided which are made solely out of instant coffee (also referred to as soluble coffee). However, instant coffee is not preferred by some consumers. A number of processes are known for forming tablets and other shaped articles from granular materials by compression. Most such processes require (1) filling a die, typically closed off at the bottom by a bottom tool, with the material to be tabletted (2) compressing the filled material between upper and lower tools, and (3) ejecting the tablet so formed from the die.

In light of the above and in view of the current products available in the marketplace, it would be desirable to develop a coffee composition and one or more items made therefrom that utilize a combination of instant coffee with one or more of roast coffee and/or ground coffee to achieve a coffee composition able to achieve a variety of brew amounts while still maintaining the product's integrity in combination with providing faster disassociation when brewed, thereby advantageously providing a variety of consistent coffee products of varying strengths.

SUMMARY OF THE INVENTION

Provided are structured coffee compositions and to various items made using such structured coffee compositions. In one embodiment, the structured coffee compositions may be used in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

In one embodiment, the present invention relates to a structured coffee composition comprising: a plurality of ground roast coffee particles that each include an outer surface; and a coating of one or more coffee extracts and one or more extracts from the roast and ground coffee particles on the outer surface of the ground roast coffee particles, wherein the one or more coffee extracts binds the plurality of roast and ground coffee particles together to form a structure with porosity that is greater than 40%; and wherein a weight percent of the ground roast coffee particles is in the range of about 65 wt % to about 90 wt % based on the total weight of the roast and ground coffee particles and the one or more coffee extracts, and a weight percent of the one or more coffee extracts is in the range of about 10 wt % to about 35 wt % based on the total weight of roast and the ground coffee particles and the one or more coffee extracts.

The structured coffee composition may take the form of a cylinder, cube, cuboid, sphere, pellet, ellipsoid, triangular pyramid, hexagonal prism, truncated triangular pyramid, truncated square pyramid, hexagonal pyramid, truncated hexagonal pyramid, cone, truncated cone, diamond, a three dimensional shape with an oval-shaped face, a three dimensional shape with heart-shaped face, a three dimensional shape with triangle-shaped face, or pillow.

In another embodiment, the present invention relates to a method of making a structured coffee composition comprising the steps of: (A) supplying a solution of one or more coffee extracts that includes coffee solids; (B) mixing the one or more ground roast coffees and the solution of one or more coffee extracts until a granulated composition is formed; (C) forming a structure from the granulated composition; and (D) drying the granulated composition to achieve a moisture content of less than 10 wt % based on the total weight of the structured coffee composition and a porosity that is greater than 40%; wherein a weight percent of the one or more roasted ground coffees is in the range of about 60 wt % to about 90 wt % based on of the total weight of the one or more roast and ground coffees and the coffee solids in the one or more coffee extracts, and a weight percent of the coffee solids in the one or more coffee extracts is in the range of about 10 wt % to about 40 wt % based on of the total weight of one or more roast and ground coffee particles and the coffee solids of the one or more coffee extracts.

The solution of one or more coffee extracts may be in the form of a liquid coffee concentrate. Further, the structured coffee composition may be in the form of an agglomerate. The foregoing method above may be used to make a structured coffee composition.

These and other non-limiting aspects of the present disclosure are discussed further herein. The various features of novelty which characterize the invention are pointed out with particularity in the claims annexed to and forming a part of this disclosure. For a better understanding of the invention, its advantages and specific objects attained by its uses, reference is made to the accompanying descriptive matter and drawings in which various embodiments of the invention are illustrated.

BRIEF DESCRIPTION OF THE DRAWINGS

The invention can take form in various compositions and in various process operations. The following is a brief description of the drawings, which are presented for the purposes of illustrating the exemplary embodiments disclosed herein and not for the purposes of limiting the same.

The present invention can be more readily understood by reference to the following drawings wherein.

DETAILED DESCRIPTION OF THE INVENTION

Figure 1:
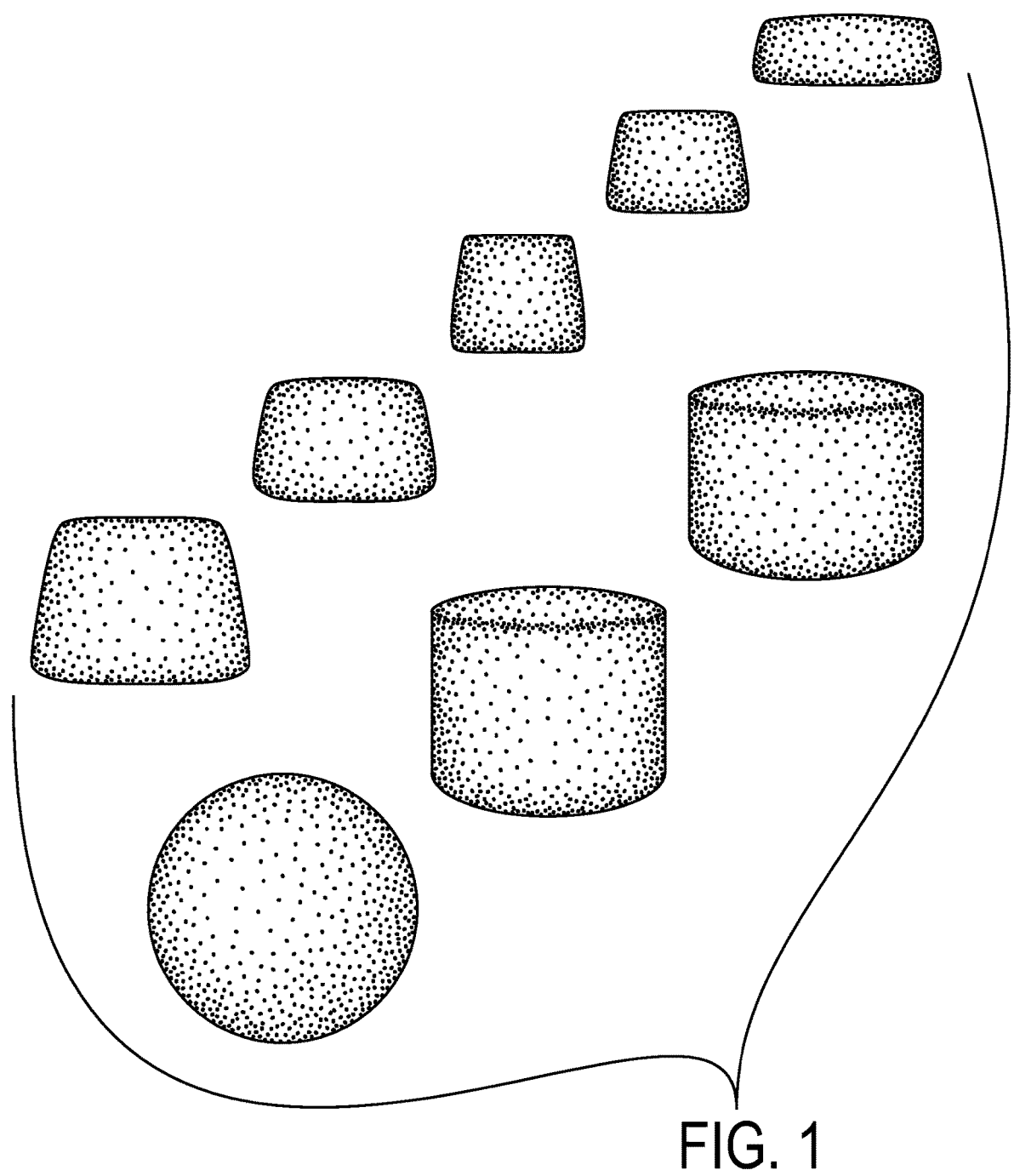
FIG. 1 is an illustration of various structured coffee compositions.

The following discussion is presented to enable a person skilled in the art to make and use one or more of the present embodiments. The general principles described herein can be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Unless otherwise defined, all technical and scientific terms used herein have the same meaning as commonly understood by one of ordinary skill in the art to which the present invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety as though they are fully set forth herein.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that can vary depending on the desired properties sought to be obtained by embodiments of the present invention. Notwithstanding that the numerical ranges and parameters setting forth the broad scope of the invention are approximations; the numerical values set forth in the specific examples are reported with relative precision. Any numerical values, however, inherently contain certain errors necessarily resulting from error found in their respective measurements.

As noted above, the present invention relates to structured coffee compositions and to various items made using such coffee compositions. In one embodiment, the present invention relates to coffee compositions suitable for use in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

Terminology

Unless otherwise indicated expressly or from context, the following terms will have the following meanings:

"Non-Coffee Binder" means a material which improves the structural integrity of a coffee composition made in accordance with the present invention. "Non-Coffee Binder" does not include ingredients which, although providing some binding activity, provide some other function in significant amount such as contributing to taste, health effects, etc., or any one or more binders made from one or more coffee ingredients and some amount of water.

"Brewed coffee" means a liquid coffee drink formed by extracting coffee solids from ground, roasted coffee beans or substitutes. "Brewed coffee" includes coffee drinks formed from regular coffee, decaffeinated coffee, liquid coffee concentrate, instant coffee and coffee substitutes such as chicory.

"Coffee," "regular coffee," and "ground roast coffee" mean a mass of solid, non-decaffeinated particles derived by comminuting roasted coffee beans. Ground roast coffee can also be referred to as "roast coffee, ground coffee, or even a combination of roast coffee and ground coffee".

"Coffee product" means any product derived from coffee beans.

"Coffee substitute" refers to a substance which is customarily used as a replacement for coffee such as ground roast chicory, roasted soybeans, and roasted grains such as corn/maize, barley, rye, oats, rice, wheat germ, spelt, buckwheat, and millet.

"Coffee solids" means the coffee constituents that are extracted or extractable during the brewing of coffee. Unless indicated otherwise, the term coffee solids refers to both the dissolved coffee solids and suspended coffee solids (e.g., very small grinds or fines).

"Decaffeinated coffee" refers to a solid derived from coffee beans, both roasted and unroasted, which contain a substantially reduced concentration of caffeine.

"Density," as it relates to ground roast coffee and unless otherwise indicated, refers to the number of ounces of that coffee that are needed to fill a container having a predetermined standard volume.

"Free-standing" in reference to a coffee composition means that the coffee composition is not housed in a filter paper container (or other container made from a similar material) which is intended to remain in place, around the composition, when the composition is in place in a brewing device so as to be contacted with water (hot, cold or any temperature therebetween) for brewing.

"Flavor Carrier" refers to a material for containing, carrying, or otherwise being mixed with coffee flavorant to facilitate using the coffee flavorant. Coffee flavorants are normally added to coffee products by means of such flavor carriers, which are provided to make dispensing, metering and mixing of the flavorant with the coffee product easier. For example, flavorants may be added to a flavor carrier in a proportion so that a consistent weight percentage (e.g., 3 weight percent) of the final carrier-containing flavorant compositions can be added to ground roast coffee regardless of the particular flavorant or flavor carrier. Flavor carriers can be in dry, liquid, or paste forms and carrier-containing flavorant compositions added to ground roast coffee can be in dry, liquid, or paste forms.

"Instant coffee" refers to a flowable, particulate coffee product that has been made by evaporating water from a previously made brewed coffee, usually by concentration and drying. Typical drying means, such as spray drying and freeze drying are known in the art. Furthermore, instant coffee used in the present invention can be prepared by any convenient process, of which a variety of processes are known to those skilled in the art. An example of instant coffee production may be found in U.S. Pat. No. 3,700,466, the entire disclosure of which is incorporated by reference as though fully set forth herein. Moreover, representative spray drying processes that can provide suitable instant coffee are disclosed in, for example, pages 382 through 513 of Sivetz & Foote, "Coffee Processing Technology," Vol. I (Avi Publishing Co. 1963), U.S. Pat. Nos. 2,771,343, 2,750,998, and 2,469,553, all of which the entire disclosure of which is incorporated by reference as though fully set forth herein. Other suitable processes for providing instant coffee for use in connection with the present invention are disclosed in, for example, U.S. Pat. Nos. 3,436,227, 3,493,388, 3,615,669, 3,620,756, and 3,652,293, all of which the entire disclosure of which is incorporated by reference as though fully set forth herein. The instant coffee for use in connection with the present invention can be prepared form any single variety of coffees or a blend of different varieties, and can be decaffeinated or un-decaffeinated, and can be processed to reflect a unique flavor characteristic as necessary. Additionally, instant coffee has many forms: spray dried powder, agglomerates, freeze dried and liquid.

"Liquid coffee concentrate" or "liquid coffee extract" as used herein designates an aqueous extract of the roasted coffee beans wherein the solids content is substantially greater than used for direct consumption as a beverage. The coffee solids content may be from about 10 wt % to about 75 wt %. The term as used here indicates a concentrated coffee extract, irrespective of this being liquid or a solid deep frozen coffee concentrate. As is generally known coffee extracts are recovered by contacting roasted and ground coffee beans with water or an aqueous solution. On an industrial scale, the intention is to achieve high extraction efficiency leading to extraction of aroma substances, that is odorants and flavorings, from the ground coffee. The concentration method is not particularly limited and can be performed by a known method and apparatus, evaporation, membrane concentration, concentration under reduced pressure, freeze concentration, and the like. In order to preserve aroma, it may be desirable to remove aromas prior to concentration, and later add aromas back into the concentrate. The aroma collection method is not particularly limited. Examples of such processes can include, but are not limited to steam stripping, distillation, flash evaporation, adsorption, and the like.

"Standard serving of brewed coffee" refers, for each country of the world, brewed coffee as customarily served in that country. For example, in the United States, brewed coffee is served in two different ways, regular strength and espresso strength. In both cases, about 3 grams to about 5 grams of ground roast coffee is used to make the brewed coffee. An exemplary Folgers brand medium roast, ADC ground coffee is brewed using about 3 grams of the ground roast coffee having a density of about 0.33 g/cm$^3$ to make the brew. Regular strength coffee is made with about 5 fluid ounces to about 6 fluid ounces (about 150 mL to about 175 mL) of water, while espresso strength coffee is made with about 1.9 fluid ounces (about 55 mL) of water. Thus, in the United States, a "standard serving of brewed coffee" will be understood as referring to about 5 fluid ounces to about 6 fluid ounces (about 150 mL to about 175 mL) of regular strength brewed coffee as well as to roughly 1.9 fluid ounces (about 55 mL) of espresso strength brewed coffee.

In one embodiment, the present invention is intended for use with any automatic drip coffee maker ("ADC") designed for producing brewed coffee by hot water extraction in which hot water is dripped onto a bed of ground roast coffee. While hot water at a wide range of temperatures can be employed, exemplary temperature ranges for hot water for brewing can include about 70° C. to about 100° C., about 80° C. to about 99° C., about 85° C. to about 97° C., or about 90° C. to about 96° C. Most automatic drip coffee makers for consumer use are designed to produce anywhere from about 4 to about 12 standard servings of brewed coffee per brewing cycle. The coffee products of the present invention can be used with all such automatic drip coffee makers, regardless of the configuration of their brew baskets. Thus, the minimum number of servings for which a coffee brewer is designed can vary from machine to machine and can be one serving, four servings, ten servings, or some other number of servings. For more information related to ADC brewers see, as disclosed in U.S. Pat. Nos. 9,756,869; 9,603,376; 9,474,291; 9,474,290, which these patent applications are hereby incorporated by reference as though fully set forth herein in their entirety.

Structured Coffee Composition

The general inventive concepts encompass various embodiments that are based, at least in part, on the discovery of a structured coffee composition. In one or more embodiments, the structured coffee composition may include ground roast coffee that is bound together with coffee extract. In one or more embodiments, the structured coffee composition may be prepared by mixing a solution of coffee extract with ground roasted coffee to form a granulated composition, forming a structure from the granulated composition, and at least partially drying the structure. Examples of coffee extracts for use in the solution of coffee extract include, but are not limited to liquid coffee concentrate and instant coffee. Advantageously, the coffee extracts assist in coating and binding the particles of the ground roast coffee together. The structured coffee composition may have a random three-dimensional shape such as an agglomerate or a geometrical shape such as, for example, polyhedrons and curved three-dimensional shapes.

It has been found that by mixing a solution of coffee extract with ground roasted coffee to form a granulated composition, forming a structure from the granulated composition, and at least partially drying the structure a plurality of ground roast coffee particles in a matrix of coffee extract may be prepared. Through the mixing of the solution of coffee extract with ground roasted coffee, a portion of the ground roasted coffee is extracted. Accordingly, the resultant matrix on the ground roast coffee particles includes a mixture of the coffee extracts and extracts from the ground roast coffee. Stated differently, the coffee extract matrix is composed of compounds that originated from both the coffee exact and roast and ground coffee particles. In one or more embodiments, coffee exact may be prepared from an instant coffee, a liquid coffee concentrate, or a combination thereof. The coffee extract and ground roast coffee extract matrix may simply be referred to as the matrix. In one or more embodiments, where the matrix at least partially surrounds a ground roast coffee particle, the matrix may be referred to as a coating. For the purpose of this specification, ground roast coffee particles that include a coating of the matrix or coffee extract and extract from the round roast coffee may be referred to as the coated ground roast coffee particles. The coating at least partially covers the surface of the ground roast coffee particles and may fill in any cracks or crevices on the surface of the particle. The coating of the ground roast coffee particles may also bind the particles together to form a structured coffee composition.

As indicated above, the matrix or coating of the ground roast coffee particles compositionally includes mixture of the coffee extract(s) and extract(s) from the ground roast coffee. This mixture may be experimentally shown via Fourier Transform Infrared Spectroscopy (FTIR). FTIR analysis shows a peak that corresponds with a wavelength of 940 nm in the coffee coating that is not present in coffee extracts such as those prepared from instant coffee. This peak is high in ground roasted coffee but is present in lower amounts in the coating. While not wishing to be bound by any particular theory, it is believed that the peak may be related to lipids present in the ground roast coffee, but it may also be a combination of lipids with other compounds that absorb in this region. Time of Flight Liquid Chromatography Mass Spectrometry (LCMS/QTOF) analysis of the coffee coating and ground roast coffee particles, and the coffee extracts may also be used to show compositional differences. For example, coffee extracts such as instant coffee have an extremely low amount of lipids and a different compositional background compared to roast and ground coffee. The presence of high amounts of lipids and/or composition similar to roast and ground coffee but different from instant would indicate a solvent was used. Further, visual appearance of the coating through by surface analysis using scanning electron microscopy or other surface measuring techniques may be used to identify that the coating of coffee extracts was added using a solvent. Visual appearance may also suggest that a solvent was used.

While not wishing to be bound to any one set of problems solved, the structured coffee composition advantageously provides a solution to one or more of the following problems: (a) fast disassociation in hot or cold water; (b) the creation of a larger surface area via capillary action creating void spaces due to solution of the instant component; (c) significantly higher percentages brew solids (BS) are achieved with less coffee weight and volume; (d) delivery of improved brew profile and rich color early in brew; (e) consistent results across a full range of brew methods (i.e., ADC, single serve, French Press, cup infuser, cold brew); (f) the structured coffee composition may be prepared with 100 percent coffee or coffee related flavorings/additives; (g) coffee flavor of instant coffee portion of the composition is enhanced by extraction of flavor notes from ground roast component; (h) cold brewing can be achieved with significantly less volumes of coffee and shorter brew times (e.g., four 8.5 gram structured coffee compositions may extract in 1700 milliliters of cold water at about 38.7 to about 42.3° F. in about 2 to about 4 hours or about 2 to about 3 hours for cold brew coffee with a percent brew solids of about 1.0 to about 1.5); and (i) the product stays fresher longer (less staling perception) when stored in low barrier packaging.

Ingredients:
Ground Roast Coffee

As indicated above, the structured coffee composition may be prepared from ground roast coffee. Ground roast coffee is made from coffee beans, which are the seeds of "cherries" that grow on coffee trees in a narrow subtropical region around the world. There are many coffee varieties, however, it is generally recognized that there are two primary commercial coffee species: *Coffea arabica* (herein "Arabica(s)") and *Coffea canephora* var. *robusta* (herein "Robusta(s)"). See, US 2008/0118604, the disclosure of which is incorporated herein by reference as though fully set forth in its entirety. Virtually any of the above varieties and types of ground coffees produced from the coffee beans discussed above can be used to make the structured coffee composition. Further, mixtures of two or more different varieties, or types, of ground coffees described above can also be used in combination to prepare the structured coffee composition.

When removed from the coffee cherry, coffee beans normally have a distinctly green color and a high moisture content. Therefore, they are normally dried prior to export, typically to a moisture content of about 12 weight percent. Historically, solar drying was the method of choice, although machine drying is now normally used due to the reliability and efficiency of the machine dryers available for this purpose. See, Sivetz et al., *Coffee Technology*, "Drying Green Coffee Beans", pp. 112 to 169 (1979). Sivetz also highlights the irreversible damage over-drying can have on coffee quality.

In other embodiments, the coffee been may be "pre-dried" prior to roasting. In these or other embodiments, the coffee beans may be dried to a moisture content in the range of about 0.5% to about 10% by weight. Exemplary methods of pre-drying a coffee bean are disclosed in U.S. Pat. Nos. 5,160,757 and 5,322,703 and which are both incorporated by reference as though fully set forth herein. This drying may take place at the end of the standard drying or may be added as an additional drying step prior to roasting. However, in either case, the moisture should be reduced prior to roasting. This additional or low moisture drying can occur at any suitable set of conditions in one or more additional drying steps and is conveniently done by heating the coffee beans at a temperature in the range of about 70° F. to about 325° F. (21° ° C. to 163° C.), or from about 90° F. to about 300° F., or from about 120° F. to about 275° F., or even from about 160° F. to about 250° F. over drying times lasting about 1 minute to about 24 hours, or from about 30 minutes to about 24 hours, or from about 1 hour to about 24 hours, or from about 2 hours to about 12 hours, or from about 3 hours to about 6 hours, or even from about 4 hours to about 5 hours.

After drying the green coffee beans (and optionally pre-drying the coffee beans), the coffee beans to are typically processed into conventional ground roast coffee by roasting followed by grinding. Any of the variety of roasting techniques known to the art can be used to roast the green coffee in the process of the present invention. In the normal operation of preparing conventional roast and ground coffee, coffee beans can be roasted in a hot gas medium at temperature ranges of about 176.8° C. to about 371.1° C. (about 350° F. to about 700° F.), or about 176.8° C. to about 260° C. (about 350° F. to about 500° F.), or about 204.4° C. to about 232.2° C. (about 400° ° C. to about 450° F.), or about 260° ° C. to about 287.8° C. (about 500° C. to about 550° F.), or about 315.6° C. to about 348.9° C. (about 600° C. to about 660° F.), with the time of roasting being dependent on the flavor characteristics desired in the coffee beverage when brewed. Here, as well as elsewhere in the specification and claims, individual numerical values, or limits, can be combined to form additional non-disclosed and/or non-stated ranges.

Where coffee beans are roasted in a batch process, the batch roasting time at the hereinbefore given temperatures is generally from about 2 minutes to about 20 minutes, and can, for example, be about 10 minutes to about 20 minutes or about 12 minutes to about 18 minutes, or can be about 2 minutes to about 10 minutes, or about 2 minutes to about 6 minutes, or about 2 minutes to about 4 minutes, or about 2 minutes to about 3 minutes. Where coffee beans are roasted in a continuous process, the residence time of the coffee beans in the roaster is typically from about 30 seconds to about 9 minutes, and can, for example, be about 30 seconds to 6 about minutes, or about 30 seconds to about 4 minutes, or about 1 minutes to about 3 minutes. The roasting procedure can involve static bed roasting as well as fluidized bed roasting. A preferred type of roasting would be using fast roasters. While any method of heat transfer can be used in this regard, convective heat transfer, especially forced convection, is normally used for convenience. The convective media can be an inert gas or, more typically, air. Typically, the beans are charged to a bubbling bed or fluidized bed roaster where they contact a hot air stream at inlet air temperature of from about 350° F. to about 1200° F. (about 177 C to about 649° C.), or from about 400° F. to about 800° F. (about 204° ° C. to about 427° C.), at roast times form about 10 seconds to not longer than about 5.5 minutes, or from about 10 seconds to about 47 seconds.

As is well known to coffee professionals, it is conventional to refer to the degree or extent to which coffee beans are roasted in terms of their Hunter color level. The Hunter Color "L" scale system is generally used to define the color of the coffee beans and the degree to which they have been roasted. Hunter Color "L" scale values are units of light reflectance measurement, and the higher the value is, the lighter the color is since a lighter colored material reflects more light. Thus, in measuring degrees of roast, the lower the "L" scale value the greater the degree of roast, since the greater the degree of roast, the darker is the color of the roasted bean. This roast color is usually measured on the roasted, quenched and cooled coffee beans prior to subsequent processing (e.g., grinding and/or flaking) into a brewed coffee product. However, color may be measured on finished product, in which case the color will be designated as such. See, pages 985-95 of R. S. Hunter, "Photoelectric Color Difference Meter," J. of the Optical Soc. of Amer., Volume 48 (1958).

The ground roast coffee that is used to make the structured coffee composition can be made from coffee beans roasted to any desired roast color from about 10 L (very dark) to about 25 L (very light). In some embodiments, it is contemplated that the coffee beans will be fast roasted to an average color of from about 13 to about 19 Hunter L units, or from about 14 to about 18 Hunter L units, or even about 15 to about 17 Hunter L units.

Once the coffee beans are roasted, they are ground to a desired average particle size. Average particles sizes on the order of as low as about 250 μm (microns) and as high as about 3 mm, as measured by Laser Diffraction on a Sympatec Rodos Helos laser particle size analyzer, are conventional. Average particle sizes on the order of about 400 μm to about 2,500 μm, or from about 500 μm to about 2,400 μm, or from about 650 μm to about 2,200 μm, or from about 800 μm to about 2,000 μm, or from about 900 μm to about 1,800 μm, or from about 1,000 μm to about 1,600 μm, or from about 1,200 μm to about 1,400 μm, or even about 1,300 μm. The coffee beans can be ground to other average particle sizes, including for example, average particle sizes of about 400 μm to about 1.5 mm, or from about 300 μm to about 1,600 μm, or even from about 1 mm to about 2 mm. It is also recognized that larger coffee particles can be broken down during three-dimensional shape molding, resulting in smaller average particle sizes within the molded structure formed from the various coffee compositions described herein.

In one or embodiments, the size of the ground roast coffee particles may be described with reference to the size range of the coffee typically employed for a particular brewing method. In one or more embodiments, the ground roast coffee particles may be a coarse grind typically used for French press or percolator coffee brew, for example (e.g., about 900 microns to about 1400 microns), a medium-coarse grind typically used for pour over brewers, flat bottom drip brewer or ADC, or Aeropress, for example, (e.g., about 800 microns to about 1200 microns), a medium grind typically used for clever dripper, café solo, or single serve brewer, for example, (e.g., about 500 microns to about 900 microns), a medium fine grind typically used for Turkish coffee, for example, (e.g., about 200 microns to about 550 microns) or a super fine grind typically used for espresso, or moka pot, for example (e.g., about 200 microns to about 450 microns), or any one or more combinations thereof based on the desired type of coffee beverage and coffee strength. Of course, there can be a size distribution around these mean particle sizes, so that the grind can be further characterized by full particle size distribution curve. One convenient measure is Q250, the percent of particles less than about 250 microns, which represents the amount of finer particles (or "fines") that are included in the distribution and that help make up the mean size.

In one or more embodiment the roast ground coffee particles may be prepared using mill flaking. Mill flaking technology or mill flaking is a unique grinding process that creates a larger surface area on each flake for hot water to easily extract more of our coffee flavor. Flaked coffee is further disclosed in for example, U.S. Pat. No. 5,064,676, the entire disclosure of which is incorporated by reference as though fully set forth herein.

As appreciated by skilled coffee professionals, different ground coffees exhibit different bulk densities depending on the type of coffee used, the method by which the coffee is roasted, the color of the roasted coffee, the particle size to which the coffee is ground, moisture content, and other factors. In accordance with the present invention, the structured coffee compositions can be made for ground roast coffee having any conventional density. So, for example, the structured coffee composition can be made from ground roast coffees having "regular" densities ranging between about 0.26 g/mL to about 0.35 g/mL such as, for example, about 0.263 g/mL, about 0.288 g/mL, about 0.325 g/mL, or even about 0.35 g/mL, if desired. Alternatively, the structured coffee composition can also be made for ground roast coffees having lower or higher densities, if desired. For example, the structured coffee compositions can be made from high density coffees having densities of greater than about 0.40 g/cm$^3$, e.g., densities of up to about 0.60 g/cm$^3$, although even higher densities are contemplated and within the scope of the present invention. Similarly, the structured coffee composition can be made from low density coffees having densities of less than about 0.18 g/mL to about 0.26 g/cm$^3$, e.g., densities of about 0.18 g/cm$^3$ to about 0.26 g/cm$^3$, about 0.20 g/cm$^3$ to about 0.25 g/cm$^3$, or even about 0.22 g/cm$^3$ to about 0.23 g/cm$^3$ (such as about 0.19 g/cm$^3$, about 0.20 g/cm$^3$, about 0.21 g/cm$^3$, about 0.22 g/cm$^3$, about 0.23 g/cm$^3$, about 0.24 g/cm$^3$ or even about 0.25 g/cm$^3$). Furthermore, the structured coffee composition can be made from higher density coffees having densities from about 0.39 g/cc to about 0.57 g/cc, or from about 0.40 g/cc to about 0.56 g/cc, or from about 0.46 g/cc to about 0.48 g/cc, or even about 0.47 g/cc. In this regard, see U.S. Pat. No. 5,160,757 for a description of how to make low density coffees and U.S. Pat. No. 5,227,188 for a description of how to make high density coffees. The entire disclosures of both of these patents are incorporated herein by reference as though fully set forth herein in their entireties.

As appreciated by skilled coffee professionals, different ground coffees also exhibit different moisture contents depending on the type of coffee used, the method by which the coffee is roasted, the color of the roasted coffee, the particle size to which the coffee is ground, and other factors. So, for example, the structured coffee composition can be made from ground roast coffees having moisture contents of about 1 weight percent to about 7 weight percent, or from about 1.5 weight percent to about 6.5 weight percent, or from about 2 weight percent to about 6 weight percent, or from about 2.5 weight percent to about 5.5 weight percent, or from about 3 weight percent to about 5 weight percent, or from about 3.5 weight percent to about 4.5 weight percent, or even from about 3.75 to about 4.25 weight percent. In one instance, the inventive coffee composition can be made from ground roast coffees having moisture contents of about 1.5 weight percent to about 6.6 weight percent, or from about 2.85 weight percent to about 6 weight percent, or even from about 4.5 weight percent to about 4.85 weight percent.

Generally speaking, the structured coffee composition can also be made from mixtures of two or more of the coffees described above. So, for example, the structured coffee composition can be made from mixtures of ground roast coffees having different densities, different Hunter L colors, different particle sizes, different moisture contents, and different combinations thereof (i.e., one ground roast coffee could have a low density and a high moisture content while another ground roast coffee could have a medium density and a low moisture content). Thus, the structured coffee composition can be made from mixtures of regular and high density coffees, mixtures of regular and low density coffees, mixtures of high and low density coffees, and mixtures of high, regular and low density coffees, if desired. In addition, the structured coffee composition can be made from mixtures ground roast coffees having high and low Hunter L color numbers, large and small average particle sizes, etc.

Moreover, although some or all of this ground roast coffee can be decaffeinated, in one embodiment it is desirable that essentially all of the ground roast coffee is "regular," i.e., non-decaffeinated coffee. In another instance, embodiments in which essentially all of the ground roast coffee in the coffee compositions of the present invention is/are decaffeinated are also within the scope of the present invention.

In one or more embodiments, the amount of one or more ground roast coffees (both regular and decaffeinated) included in the structured coffee composition used are in the range of about 65 weight percent to about 90 weight percent, or from about 67.5 weight percent to about 87.5 weight percent, or from about 70 weight percent to about 85 weight percent, or from about 72.5 weight percent to about 82.5 weight percent, or from about 75 weight percent to about 80 weight percent even about 77.5 weight percent, based on of the total weight of the roast and ground coffee and the coffee extract.

Instant Coffee

As indicated above, the structured coffee composition may include instant coffee. The instant coffee may be used to form a slurry in the preparation of the structured coffee composition by adding water to an instant coffee. The slurry is then combined with roast and ground coffee. It has been found that when an instant coffee is included in the structured coffee composition, the instant coffee may be used as one or more of a binder, a coating aid, a disintegration aid, and a brewing aid.

The presence of instant coffee in coffee compositions and/or structures can be detected by a number of different methods. However, one method is described in R. M. Noyes and C. M. Chu, "Material Balance on Free Sugars in the Production of Instant Coffee", ASIC, 15th Colloque, Montpellier, 1993, which is incorporated herein by reference. Also, the differences in visible appearance and the hygroscopic nature of instant coffee might permit the presence of instant coffee in a coffee product to be detected by a visual inspection, especially if observed under a microscope. See various methods of detecting presence of instant coffee also as disclosed in U.S. Pat. Nos. 9,756,869; 9,603,376; 9,474,291; 9,474,290, which these patent applications are hereby incorporated by reference as though fully set forth herein in their entirety.

As appreciated by skilled coffee professionals, different instant coffees also exhibit different moisture contents depending on the method of which the instant coffee is prepared and other factors. In one or more embodiments, the instant coffee may have a moisture content of less than 7 weight percent, or less than 6.5 weight percent, or less than 6 weight percent, or of less than 5.5 weight percent, or of less than 5 weight percent, or less than 4.5 weight percent, or of less than 4 weight percent, or less than 3.5 weight percent, or of less than 3 weight percent. In one or more embodiments, the instant coffee may have a moisture content of about 0.5 weight percent to about 7 weight percent, or from about 1 weight percent to about 6.5 weight percent, or from about 1.5 weight percent to about 6 weight percent, or from about 2 weight percent to about 5.5 weight percent, or from about 2.5 weight percent to about 5 weight percent, or from about 3 weight percent to about 4.5 weight percent, or even from about 3.5 to about 4.25 weight percent.

Suitable instant coffee for use in the structured coffee composition include, but are not limited to, spray dried powder, agglomerates, freeze dried and liquid instant coffees. In one or more embodiments, the instant coffee may be characterized by the yield of the instant coffee. The instant coffee may be a high yield instant coffee, a medium yield instant coffee, or a low yield instant coffee. High yield instant coffees include those instant coffees that are prepared with an extraction of greater than 45%. High yields instant coffees may be obtained using a primary and then a secondary extract with high water temperatures. Typically, high yield instant coffees include a high robusta content to maximize extraction yield. Medium yield instant coffees include those instant coffees that are prepared with an extraction of between 25% to 45%. Typically, medium yield instant coffees include a high Arabica content with a minimal *robusta* content. Low yield instant coffees include those instant coffees that are prepared with an extraction of less than 25%. Low yield instant coffees may be obtained using only a primary extraction at temperatures generally at or below 100° C. Typically, low yield instant coffees include a high *Arabica* content (up to 100%). In one or more embodiments, the instant coffee may be characterized by the quality of the instant coffee. The instant coffee may be a high quality instant coffee or a low quality instant coffee. High quality instant coffees include those instant coffees that produce a cup of brewed coffee with an aroma similar to a roast and ground coffee and have a flavor with minimal processed and Carmel notes. Typically, high quality instant coffees include a high *Arabica* content (up to 100%) and are produced at a low extraction yield. Low quality instant coffees include those instant coffees that have a dull or unexciting flavor that may taste stale. Typically, low quality instant coffees include a high robusta content and are produced at a high extraction yield. In some embodiments a low yield, high quality instant coffee is used. In another embodiment a high yield instant coffee is used. The structured coffee composition may employ a variety and types of instant coffee can be used, including a high yield, high quality instant coffee, a high yield, low quality instant, or a low yield, low quality instant, or one or more combinations thereof any one or more instant coffee varieties and types of instant coffee. Exemplary instant coffees can be used with the present invention to make the coffee composition, including but not limited to, those as shown below in Table 1.

TABLE 1

| Supplier | Instant Coffee | Type |
| --- | --- | --- |
| Haco | IC SD Premium Breakfast FO | Low Yield-High Quality |
| Haco | Columbian | Low Yield-High Quality |
| Bustelo | Bustelo Freeze Dried | Low Yield-High Quality |
| Bustelo | Decaf Freeze Dried | |
| Suffolk | Decaf Colombian #947 | Low Yield-High Quality |

TABLE 1-continued

| Supplier | Instant Coffee | Type |
|---|---|---|
| Colcafe | PDM-100% Col. Spray dried | |
| Suffolk | Colombian #932 | Low Yield-High Quality |
| Suffolk | Washed Arabica 65%/Robusta 35% #904 | Low Yield-High Quality |
| Suffolk | Washed Arabica 60%/Folgers A Braz 40% #913 Robusta 35% | Low Yield-High Quality |
| Suffolk | Washed Arabica 65%/Robusta 35% #904 | Low Yield-High Quality |
| Suffolk | Washed Arabica 60%/Folgers A Braz 40% #913 Robusta 35% | Low Yield-High Quality |
| Iguacu | IGUA SU Type 100012270 | High Yield |
| Medaglia | Medaglia O'ORO Instant | High Yield |
| Kava | Kava Acid Neutralized Instant | High Yield |
| Folgers crystals | Folgers Instant Crystals | High Yield |
| Bustelo | Café Bustelo Mexican Blend | High Yield |
| Pilon | Pilon Instant Espresso Coffee | High Yield |
| Bustelo | Espresso Café Bustelo Instant Coffee | High Yield |
| Iguacu | 100% Arabica | |
| Prosol | Spray dried instant Ref: L-136050 | Spray Dried Decaf-High yield |
| Suffolk | Colombian #932 | Low Yield-High Quality |

The amount of instant coffee that may be included in the structured coffee composition should be enough to achieve a noticeable improvement in one property such as binding strength, ease of disintegration and/or brewing efficiency, and staling resistance. In one or more embodiments, the instant coffee that may be included in the structured coffee composition in an amount that will not unduly alter the flavor of the coffee brew produced. In one embodiments, instant coffees may be included in the structured coffee compositions in the range of about 35 weight percent to about 10 weight percent, or from about 32.5 weight percent to about 12.5 weight percent, or from about 30 weight percent to about 15 weight percent, or from about 27.5 weight percent to about 17.5 weight percent, or from about 25 weight percent to about 20 weight percent or even about 22.5 weight percent, based on of the total weight of the roast and ground coffee and the coffee extract.

Liquid Coffee Concentrate

As indicated above, the structured coffee composition may include a liquid coffee concentrate. Liquid coffee concentrates may be purchased commercially or prepared prior to inclusion in the structured coffee composition. It has been found that when a liquid coffee concentrate is included in the preparation of a structured coffee composition, the liquid coffee concentrate may be used as one or more of a binder, a coating aid, a disintegration aid, and a brewing aid.

In one or more embodiments, a liquid coffee concentrates may be prepared by concentrating the draw-off stream from a liquid extraction process. This process utilizes hot and/or cool water and and/or steam to extract soluble coffee from roast and ground coffee. The liquid stream may then be concentrated by either thermal evaporation or freeze concentration or an alternate method. The concentrated stream of liquid coffee extract can be utilized to create a slurry, or with a roast and ground coffee with or without adding additional process water. In order to preserve aroma, it may be desirable to remove aromas prior to concentration, and later add aromas back into the concentrate. The aroma collection method is not particularly limited. Examples of such processes can include, but are not limited to steam stripping, distillation, flash evaporation, adsorption, and the like. An exemplary liquid coffee concentrate are described in U.S. Pat. No. 9,113,643 which is incorporated herein in their entirety.

In one or more embodiments, a commercially available liquid coffee concentrate may be employed in the structured coffee composition. Liquid coffee concentrate is often sold in frozen form, and may be thawed prior to being combined with roast and ground coffee.

In one or more embodiments, the liquid coffee concentrate may be characterized by the percent of coffee solids in the total volume of the liquid coffee concentrate. In one or more embodiments, the liquid coffee concentrate may have coffee solids in an amount of about 10% to about 75%, in other embodiments in an amount of about 15% to about 70%, in other embodiments in an amount of about 20% to about 65%, in other embodiments in an amount of about 25% to about 60%, in other embodiments in an amount of about 30% to about 58%, in other embodiments in an amount of about 35% to about 55%, and in other embodiments in an amount of about 40% to about 50%.

The amount of liquid coffee concentrate that may be included in the structured coffee composition should be enough to achieve a noticeable improvement in at least property such as binding strength, ease of disintegration and/or brewing efficiency, and staling resistance. In one or more embodiments, the coffee solids from the liquid coffee concentrate may be included in the structured coffee composition in an amount that will not unduly alter the flavor of the coffee brew produced. In one embodiments, the coffee solids from the liquid coffee concentrate may be included in the structured coffee compositions in the range of about 35 weight percent to about 10 weight percent, or from about 32.5 weight percent to about 12.5 weight percent, or from about 30 weight percent to about 15 weight percent, or from about 27.5 weight percent to about 17.5 weight percent, or from about 25 weight percent to about 20 weight percent or even about 22.5 weight percent, based on the overall weight of the total weight of structured coffee composition.

Additional Additives

The structured coffee composition may include on or more additional ingredients. For example, decaffeinated varieties of the above coffees can be used in addition to, or in place of, the ground roast coffees described above. Similarly, coffee substitutes such as ground chicory, roasted soybeans, and roasted grains such as corn, rye, wheat, barley, oats, rice, wheat germ, spelt, buckwheat, and millet can be included in the structured coffee composition (Instant coffee is not a "coffee substitute" in this context). Coffee flavorings, as further discussed below, can be included. Also, various excipients such as binders and disintegration aids can be included and, surprisingly, it has been found that some liquid flavor carriers act as a binder in coffee products. See for example, as disclosed in U.S. Pat. Nos. 9,756,869; 9,603,376; 9,474,291; 9,474,290; 6,277,428; 6,090,431; 1,951,357, and EP 813816, the entire disclosures of all of these patents are incorporated herein by reference as though fully set forth herein in their entireties. While binders included in certain embodiments, in other embodiments the structured coffee composition is free of non-coffee binders. In one or more embodiments, the additional ingredients may be added during the step of mixing the one or more ground roast coffee and the solution of one or more coffee extracts. In other embodiments, the additional ingredients may be added to the structured coffee composition (e.g., after the step of drying).

Flavorants, both liquid and solid (or dry), can be included in the structured coffee products in conventional amounts.

Exemplary flavorants include French vanilla, hazelnut, amaretto, cappuccino, chocolate, mint, peppermint, cinnamon, vanilla, caramel, maple, toffee, pumpkin, spices, Irish Cream, Kahlua®, Crème Brulee, and nut flavors such as almond and macadamia nut, and so forth. The flavorants that can be used include those known to the skilled artisan, such as natural and artificial flavorants. A solid sweetener such as white granulated sugar may be used in connection with the structured coffee product. Examples of a whitening agent that can be used in connection with the structured coffee products include liquid dairy components and dry dairy components. Other suitable sweeteners that can be used in connection with the structured coffee product are those well known in the art, including both natural and artificial sweeteners, including but not limited to also high intensity sweeteners. See, for example, U.S. Pat. Nos. 9,706,785; 10,182,583; and 10,278,407, which disclose flavorants, sweeteners, and whitening agents for inclusion into the structured coffee products. These patent applications are hereby incorporated by reference as though fully set forth herein in their entirety.

In one or more embodiments, the structured coffee composition may be made with one or more layers of additives, for example, coffee composition, flavorant, sweetener, whitener, etc. In one or more embodiments, the structured coffee composition may include one or more layers on a side of the structured coffee composition (e.g., the top, bottom, or any side or rounded face of the structured coffee composition). In these or other embodiments, the structured coffee composition may include one or more layers that bisect or are situated between two portions of the coffee composition in the structured coffee composition. In other various embodiments, the structured coffee compositions may be made with one or more various elements including the coffee composition, flavorant, sweetener, whitener, etc., wherein the structured coffee composition is a homogenous mixture of any one or more of the foregoing included therein.

Method of Making a Structured Coffee Composition:

As indicated above, the structured coffee composition may be prepared by mixing a solution of coffee extract with ground coffee to form a granulated composition, forming a structure from the granulated composition, and at least partially drying the structure.

In one or more embodiments, the solution of coffee extract may be prepared from instant coffee. In these or other embodiments, the instant coffee may be mixed with a solvent to prepare the solution of coffee extract. Suitable solvents for used in preparing the solution of coffee extract(s) include, but are not limited to water, ethanol, ethyl acetate, brewed extracts from coffee, tea, juice, carbonated water, nitrogen infused water, and liquid $CO_2$, among others. Any suitable method of mixing the instant coffee and the solvent may be used. Generally, the instant coffee and the solvent are mixed until smooth and uniform consistency is achieved. In certain embodiments, at higher concentrations, the solution of coffee extract prepared using an instant coffee may be a slurry.

In one or more embodiments, the solution of coffee extract that includes instant coffee may be described as a weight to weight ratio of the instant coffee to the solvent. In one or more embodiments, the weight to weight ratio of the instant coffee to the solvent may be from about 4:1 to about 1:2, in other embodiments from about 3:1 to about 1:1.75, in other embodiments from about 2:1 to about 1:1.5, in other embodiments from about 1.5:1 to about 1:1.25, in other embodiments from about 1.15:1 to about 1:15.1, in other embodiments from about 1.1:1 to about 1:1.1, and in other embodiments from about 1.05:1 to about 1:1.05.

In one or more embodiments, the solution of coffee extract that includes instant coffee may be described as a weight percent of coffee solids in the solution of coffee extract(s). In these or other embodiments, the solution of coffee extract(s) that includes instant coffee may include coffee solids in the range of about 3 wt % to about 75 wt %, in other embodiments in the range of about 5 wt % to about 70 wt %, in other embodiments in the range of about 10 wt % to about 65 wt %, in other embodiments in the range of about 15 wt % to about 60 wt %, in other embodiments in the range of about 20 wt % to about 55 wt %, in other embodiments in the range of about 30 wt % to about 53 wt %, and in other embodiments in the range of about 35 wt % to about 50 wt %.

In one or more embodiments, liquid coffee concentrate may be used as or to prepare the solution of coffee extract. In one or more embodiments, the liquid coffee extract may be used as prepared (i.e. the product of an extraction and an optional concentration). In other embodiments, the liquid coffee concentrate may be diluted with a solvent. In certain embodiments, at higher concentrations, the solution of coffee extract prepared using a liquid coffee concentrate may be a slurry. Regardless, in one or more embodiments, the solution of coffee extract that includes a liquid coffee concentrate may be described as a weight percent of coffee solids in the solution of coffee extract. In these or other embodiments, the solution of coffee extract that includes a liquid coffee concentrate may include coffee solids in the range of about 3 wt % to about 75 wt %, in other embodiments in the range of about 5 wt % to about 70 wt %, in other embodiments in the range of about 10 wt % to about 65 wt %, in other embodiments in the range of about 15 wt % to about 60 wt %, in other embodiments in the range of about 20 wt % to about 55 wt %, in other embodiments in the range of about 30 wt % to about 53 wt %, and in other embodiments in the range of about 35 wt % to about 50 wt %.

In one or more embodiments, the solution of coffee extracts may include a mixture of instant coffee and liquid coffee concentrate. For example, a solution of coffee extracts may be prepped by combining a solution prepared by combining instant coffee and a solvent with a liquid coffee concentrate. In other embodiments, the instant coffee may be added to a liquid coffee concentrate to prepare a solution of coffee extract(s). The ranges and amounts of coffee solids provided for the liquid coffee concentrate may be used in a solution of coffee extracts that includes a mixture of instant coffee and liquid coffee concentrate.

The solution of coffee extract(s) may then be combined with a ground roast coffee to form a granulated composition. Any suitable method of mixing the solution of coffee extract and the ground roast coffee may be used. Suitable mixing device include, but are not limited to stand mixers, spatulas, and paddle mixers. In certain embodiments, the solution of coffee extract may be sprayed on the ground roast coffee to form a granulated composition. Typically, prior to drying the granulated composition may be described as sticky.

In one or more embodiments, the amount of solution of coffee extract and the amount of ground roast coffee in the granulated composition may be described as a weight to weight ratio of the weight of the coffee solids in the solution of coffee extract to the weight of the ground roast coffee. In one or more embodiments, the ratio of the coffee solids in the solution of coffee extract to the ground roast coffee may be from about 10:90 to about 40:60, in other embodiments from about 12.5:87.5 to about 37.5:62.5, in other embodiments from about 15:85 to about 35:65, in other embodiments from about 17.5:82.5 to about 32.5:67.5, and in other embodiments from about 20:80 to about 30:70.

After the granulated composition it may be formed or otherwise shaped into a structure. In one or more embodiments, the granulated composition may be formed into an agglomerate with a random shape. In other embodiments, the granulated composition may be formed or molded into geometrical shape such as, for example, polyhedrons and curved three-dimensional shapes.

In one or more embodiments, the granulated composition may be formed into a structure using a press or a die. Suitable presses include a Carver Press, for example Model #3912. In these or other embodiments, a low amount of pressure or compaction should be employed in the forming of the structure so the resultant structured coffee composition is not completely compressed and includes a level of porosity. For example, a de minimis amount of pressure may be applied to achieve a pressure that slightly exceeds 0 pounds per square inch (PSI). In other embodiments, an amount of pressure may be applied to achieve a compaction of the granulated composition of between 60% and 70%. For example, a portion of the granulation composition may be molded using a target compaction travel on a carver press of 94% which is calculated by taking the amount in millimeters of the 100 percent travel of the die assembly and multiplying by 0.94 to determine the amount of travel in millimeters to achieve a 94% compaction travel target using hand compaction until the target travel is achieved thereby resulting in a compaction of 60 percent to 70 percent of the granulated coffee.

After the granulated composition is formed into a structure, it may be dried to form the structured coffee composition. In one or more embodiments, water or other solvents may be removed by air drying, microwave drying, infrared drying, etc.

After the drying step a residual amount of water, moisture, or a combination thereof may remain in the structured coffee composition. The solvent content (i.e. water, other solvents, or a combination of water and other solvents) of the of the structured coffee composition may be determined by oven drying coupled with weight analysis to provide the most universal method across solvents, allowing one to measure percent loss of the solvent. In one or more embodiments, the structured coffee composition may have a final solvent content of less than about 10 weight percent, less than about 9.75 weight percent, less than about 9.5 weight percent, less than about 9.25 weight percent, less than about 9 weight percent, less than about 8.75 weight percent, less than about 8.5 weight percent, less than about 8.25 weight percent, less than about 8 weight percent, less than about 7.75 weight percent, less than about 7.5 weight percent, less than about 7.25 weight percent, less than about 7 weight percent, less than about 6.75 weight percent, less than about 6.5 weight percent, less than about 6.25 weight percent, less than about 6 weight percent, less than about 5.75 weight percent, less than about 5.5 weight percent, less than about 5.25 weight percent, less than about 5 weight percent, less than about 4.75 weight percent, less than about 4.5 weight percent, less than about 4.25 weight percent, less than about 4 weight percent, less than about 3.75 weight percent, less than about 3.5 weight percent, less than about 3.25 weight percent, less than about 3 weight percent, less than about 2.75 weight percent, less than about 2.5 weight percent, less than about 2.25 weight percent, less than about 2 weight percent, less than about 1.75 weight percent, less than about 1.5 weight percent, less than about 1.25 weight percent, or even less than about 1 weight percent, based on the total weight of the coffee composition and/or structure present.

In one or more embodiments, the water content of the structured coffee composition may be described in reference to the water content of the ingredients used to form the structured coffee composition. In one or more embodiments, water content of the structured coffee composition may be within 15%, in other embodiments within 10%, and in other embodiments within 5% of the water content of the ground roast coffee employed to prepare the structured coffee composition. In still other embodiments, water content of the structured coffee composition may be within 15%, in other embodiments within 10%, and in other embodiments within 5% of the water content of the combination of the instant coffee and ground roast coffee (i.e. the percent of water in the combined amount of the instant coffee and ground roast coffee) employed to prepare the structured coffee composition. For example, if a structured coffee composition is prepared with a ground roast coffee and an instant coffee that both have an initial water content of 3%, the structured coffee composition may have a water content with 15% of 3% (i.e., 2.55% to 3.45%).

Coating Characteristics

As indicated above, the coated coffee particles include a coating that compositionally includes a mixture of the coffee extract(s) and extract(s) from the ground roast coffee. In one or more embodiments, the coating may be characterized by the mean thickness of the coating, which may be measured using electron microscopy and/or micro computed tomography (Micro CT). In one or more embodiments, the coated coffee particles may include a coating with a mean thickness of at least about 5 microns (μm), at least about 7.5 microns, at least about 10 microns, at least about 12.5 microns, at least about 17.5 microns, at least about 20 microns, at least about 22.5 microns, at least about 25 microns, at least about 27.5 microns, at least about 30 microns, at least about 32.5 microns, at least about 35 microns, at least about 37.5 microns, at least about 40 microns, at least about 42.5 microns, at least about 45 microns, at least about 47.5 microns, at least about 50 microns, at least about 52.5 microns, at least about 55 microns, at least about 57.5 microns, at least about 60 microns, at least about 62.5 microns, at least about 65 microns, at least about 67.5 microns, at least about 70 microns, at least about 72.5 microns, at least about 75 microns, at least about 77.5 microns, at least about 80 microns, at least about 82.5 microns, at least about 85 microns, at least about 87.5 microns, at least about 90 microns, at least about 92.5 microns, at least about 95 microns, at least about 97.5 microns, at least about 100 microns, at least about 102.5 microns, at least about 105 microns, at least about 107.5 microns, at least about 110 microns, at least about 112.5 microns, at least about 115 microns, at least about 117.5 microns, at least about 120 microns, at least about 122.5 microns, at least about 125 microns, at least about 127.5 microns, at least about 130 microns, at least about 132.5 microns, at least about 135 microns, at least about 137.5 microns, at least about 140 microns, at least about 142.5 microns, at least about 145 microns, at least about 147.5 microns, at least about 150 microns, at least about 152.5 microns, at least about 155 microns, at least about 157.5 microns, at least about 160 microns, at least about 162.5 microns, at least about 165 microns, at least about 167.5 microns, at least about 170 microns, at least about 172.5 microns, at least about 175 microns, at least about 177.5 microns, at least about 180 microns, at least about 182.5 microns, at least about 185 microns, at least about 187.5 microns, at least about 190 microns, at least about 192.5 microns, at least about 195 microns, at least about 197.5 microns, at least about 200 microns, at least about 202.5 microns, at least about 205 microns, at least about 207.5 microns, at least about 210 microns, at least about 212.5 microns, at least about 215 microns, at least about 217.5 microns, at least about 220 microns, at least about 222.5 microns, at least about 225 microns, at least about 227.5 microns, at least about 230 microns, at least about 232.5 microns, at least about 235 microns, at least about 237.5 microns, at least about 240 microns, at least about 242.5 microns, at least about 245 microns, at least about 247.5 microns, at least about 250 microns, at least about 252.5 microns, at least about 255 microns, at least about 257.5 microns, at least about 260 microns, at least about 262.5 microns, at least about 265 microns, at least about 267.5 microns, at least about 270 microns, at least about 272.5 microns, at least about 275 microns, at least about 277.5 microns, at least about 280 microns, at least about 282.5 microns, at least about 285 microns, at least about 287.5 microns, at least about 290 microns, at least about 292.5 microns, at least about 295 microns, at least about 297.5 microns, or even at least about 300 microns.

In these or other embodiments, the coated coffee particles may include a coating with a mean thickness of at most about 325 microns, at most about 350 microns, at most about 375 microns, at most about 400 microns, at most about 425 microns, at most about 450 microns, at most about 500 microns, at most about 525 microns, at most about 550 microns, at most about 575 microns, at most about 600 microns, at most about 625 microns, at most about 650 microns, at most about 675 microns, at most about 700 microns, at most about 725 microns, at most about 750 microns, at most about 775 microns, at most about 800 microns, at most about 825 microns, at most about 850 microns, at most about 875 microns, at most about 900 microns, at most about 925 microns, at most about 950 microns, at most about 975 microns, at most about 1000 microns, at most about 1025 microns, at most about 1050 microns, at most about 1075 microns, at most about 1100 microns, at most about 1125 microns, at most about 1150 microns, at most about 1175 microns, at most about 1200 microns, at most about 1225 microns, at most about 1250 microns, at most about 1275 microns, at most about 1300 microns, at most about 1325 microns, at most about 1350 microns, at most about 1375 microns, at most about 1400 microns, at most about 1425 microns, at most about 1450 microns, at most about 1475 microns, or even about 1500.

In one or more embodiments, the coated coffee particles may include a coating with a mean thickness of about 5 microns to about 1500 microns, in other embodiments about 10 microns to about 1450 microns, in other embodiments about 20 microns to about 1400 microns, in other embodiments about 30 microns to about 1350 microns, in other embodiments about 40 microns to about 1300 microns, in other embodiments about 50 microns to about 1250 microns, in other embodiments about 60 microns to about 1200 microns, in other embodiments about 70 microns to about 1150 microns, in other embodiments about 80 microns to about 1100 microns, in other embodiments about 90 microns to about 1050 microns, in other embodiments about 100 microns to about 1000 microns, in other embodiments about 110 microns to about 950 microns, in other embodiments about 120 microns to about 900 microns, in other embodiments about 130 microns to about 850 microns, in other embodiments about 140 microns to about 800 microns, in other embodiments about 150 microns to about 750 microns, in other embodiments about 160 microns to about 700 microns, in other embodiments about 175 microns to about 600 microns, in other embodiments about 200 microns to about 550 microns, in other embodiments about 225 microns to about 500 microns, in other embodiments about 250 microns to about 450 microns, in other embodiments about 275 microns to about 400 microns, in other embodiments about 290 microns to about 350 microns, and in other embodiments about 300 microns to about 325 microns.

In one or more embodiments, the coating may be characterized by the amount of the surface of the coffee particle that is coated by the coating that includes a mixture of the coffee extract and extract from the ground roast coffee. In one or more embodiments, the average surface area coverage of the coffee particle is in the range of about 50 percent to 100 percent, about 52.5 percent to 97.5 percent, or from about 55 percent to about 95 percent, or from about 57.5 percent to about 92.5 percent, or from about 60 percent to about 90 percent, or from about 62.5 percent to about 87.5 percent, or from about 65 percent to about 85 percent, or from about 67.5 percent to about 82.5 percent, or from about 70 percent to about 80 percent, or from about 72.5 percent to about 77.5 percent, or even about 75 percent of the exposed surface area of the coffee particle.

Composition Size and Configuration:

Although the structured coffee compositions may be made in any size and/or three-dimensional geometric shape, they are normally designed at least in some embodiments to produce a single standard serving of brewed coffee, or a whole multiple or major fraction of a single standard serving. For example, in some embodiments, the structured coffee compositions may be designed to produce whole multiples of a single standard serving, e.g., to produce two standard servings of brewed coffee or three standard servings. In other embodiments, an structured coffee may be made larger, to produce more than a single serving of coffee, and can optionally be designed with surface scoring to allow a user to break any coffee structure made from the one or more coffee compositions into smaller pre-designated portions (i.e., break a molded product/pellet in half or into fourths, etc.), and the individual portions could then be used to produce separate coffee servings. In other embodiments, the structured coffee compositions may be designed to produce a major fraction of a standard single serving such as one-half of a standard serving, or one-third of standard serving, or one-quarter of standard serving. The end user/consumer may add or reduce the number of coffee structures (e.g., pellets, molded products, etc.) to control strength of the brewed coffee to match their particular taste preference, to achieve brewed coffee that is weaker or stronger than normal. Since, in one embodiment, the structured coffee compositions may be designed to be dividable, any potentially desired ratio of coffee structures to standard coffee servings can potentially be achieved. See for example, as disclosed in U.S. Pat. Nos. 9,756,869; 9,603,376; 9,474,291; and 9,474,290, which disclose methods of adjusting the weakness or strength of a standard brewed coffee, the entire disclosures of all of these patents are incorporated herein by reference as though fully set forth herein in their entireties. Furthermore, about one (1) standard serving of coffee compositions or coffee structure product may make about one (1) cup of coffee; or about three (3) standard servings of coffee compositions or coffee structure product may make about two (2) to three (3) cups of coffee; or about four (4) standard serving of coffee compositions or coffee structure product may make about four (4) to seven (7) cups of coffee; or even about five (5) standard serving of coffee compositions or coffee structure product may make about eight (8) to twelve (12) cups of coffee.

Figure 2:
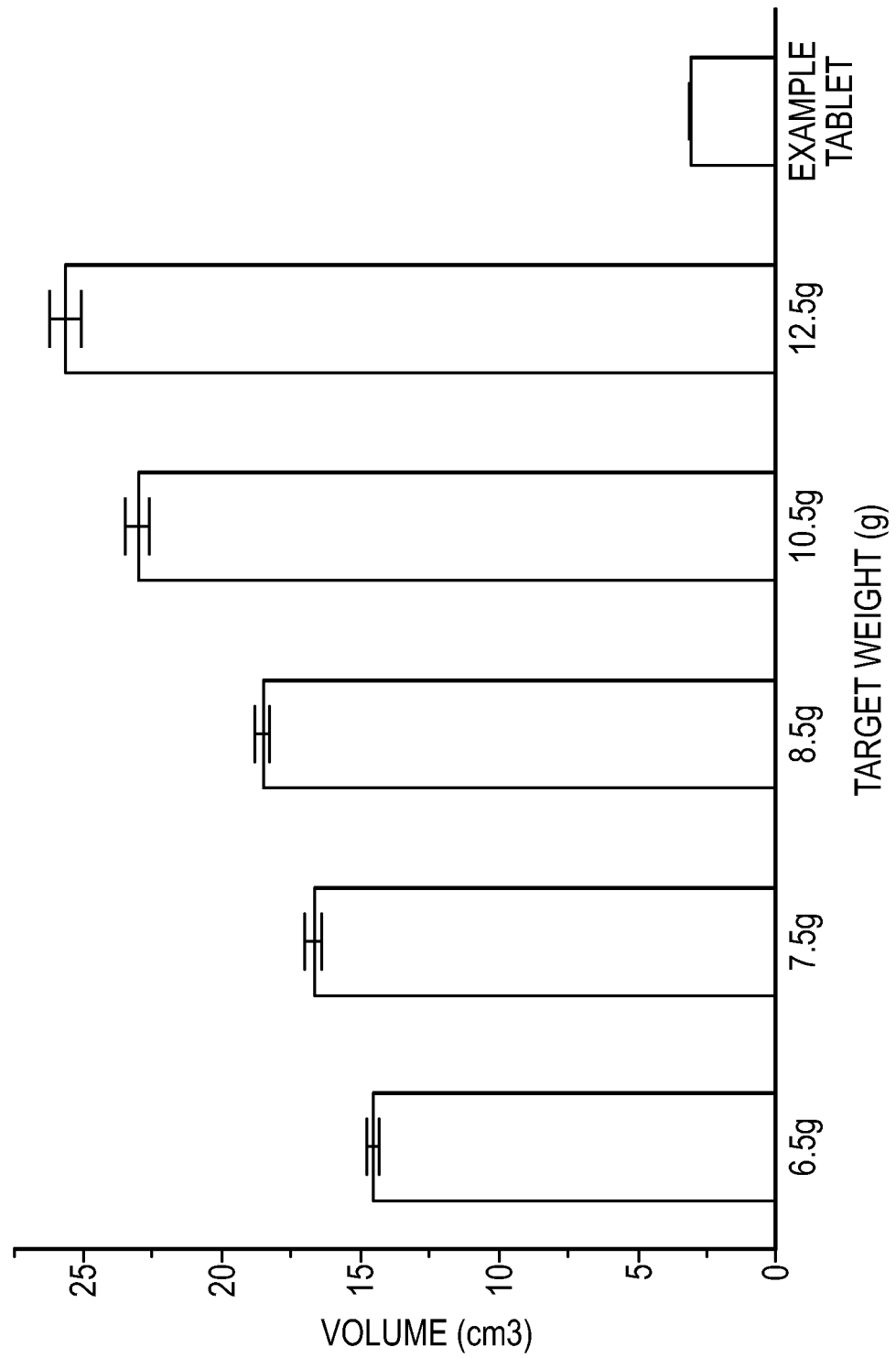
FIG. 2 is a graphical plot of the various volumes of three-dimensional structures of various examples of the present invention and including a comparative example of a tablet structure.

While not wishing to be bound to any one set of dimensions, the process and ingredients the structured coffee composition may have a cylindrical structure measuring about 29 mm to about 33 mm in diameter and about 19.5 mm to about 32 mm in thickness and about 14.0 cm$^3$ to about 27.0 cm$^3$ in volume, which can have variations thereabout as further described below and shown in FIG. 2, and Tables 2, 3, and 4. The diameter and thickness can have variations thereabout of plus or minus 0.1 mm to 2.0 mm.

In one or more embodiments, the structured coffee compositions may have a weight of 6.5 grams, about 7.5 grams, about 8.5 grams, about 10.5 grams, or even about 12.5 grams, which can have variations thereabout of plus or minus 0.1 grams to 0.5 grams. In other embodiments, the structured coffee compositions may have a weight of 13 grams, about 15 grams, about 17 grams, about 21 grams, or even about 25 grams, which can have variations thereabout of plus or minus 0.1 grams to 0.5 grams. In other embodiments, the structured coffee compositions may have a weight of 19.5 grams, about 22.5 grams, about 25.5 grams, about 31.5 grams, or even about 37.5 grams, which can have variations thereabout of plus or minus 0.1 grams to 0.5 grams. In other embodiments, the structured coffee compositions may have a weight of 26 grams, about 30 grams, about 34 grams, about 42 grams, or even about 50 grams, which can have variations thereabout of plus or minus 0.1 grams to 0.5 grams. Similarly, structured coffee compositions made with different dose sizes, e.g., a coffee product made to produce one-third of a standard serving of brewed coffee per structure or molded product, will also have correspondingly different sizes.

Different structure configurations for the structured coffee composition are also possible. For example, cylinder, cube, cuboid, sphere, pellet, ellipsoid, triangular pyramid, hexagonal prism, truncated triangular pyramid, truncated square pyramid, hexagonal pyramid, truncated hexagonal pyramid, cone, truncated cone, diamond, a three dimensional shape with an oval-shaped face, a three dimensional shape with heart-shaped face, a three dimensional shape with triangle-shaped face, or pillow shape are contemplated. Further, at least one side of a generally cylindrical molded structure can, if so desired, be concave or convex. Additionally, or alternatively, the outer surface of a structure or molded product can have ridges, bumps, surface scoring, or embossments. Further, the structured coffee compositions may be in the form of a particulate or an agglomeration of particles. See FIG. 1 for examples of structural shapes. It should also be noted that comparative examples are shown in some tables and figures herein, which can be labeled "Tablet Example". The comparative example, "Tablet Example", is a coffee tablet made using a multi-step compaction process as disclosed in U.S. Pat. Nos. 9,756,869; 9,603,376; 9,474,291; 9,474,290, which these patent applications are hereby incorporated by reference as though fully set forth herein in their entirety.

Resistance to Staling

In one or more embodiments, the structured coffee compositions may have a resistance to staling or a reduced perception of staling. Resistance to staling may be measured through the quantification of lipid oxidation byproducts, such as hexanal, that are known to be generated during coffee staling and contribute to the perception of stale coffee particulate or products. Reduced perception of staling in roasted coffee particulate or products by the end user (consumer) once brewed, can be measured though the use of a trained sensory panel calibrated to identify stale notes, such as "papery," in a coffee brew. Advantageously, the structured coffee compositions may protect coffee flavor from one or more negative organoleptic effects, such as development of paper off-notes, of staling, especially those staling effects caused by lipid oxidation. In one embodiment, this is accomplished via the use of a coated coffee particulate or product (i.e., roasted and ground coffee or coffee structures formed from a roasted and ground coffee particulate or product that has been coated in any manner discussed herein) which may limit exposure of such a coffee particulate or product to environmental conditions that cause or result in enhanced lipid oxidation. In addition, the structured coffee compositions minimize surface area to volume ratios for coffee particulate or products that will be exposed to oxidative forces, further minimizing lipid oxidation and staling thereof.

In one or more embodiments, staling may be determined by exposing structured coffee compositions to UV light for a period of 4 days in a UV light box. After the exposure to UV light, the structured coffee compositions may be brewed and assessed by expert panelists for staling. The trained expert panelists score the staling of the coffee based on a scale from 1 (not stale) to 5 (very stale), where scores 3 or above are recognized as staling of the coffee samples. For example, the following descriptors apply to the scores: 1 (Not Stale); 2 (Very Slight Off Note); 3 (Slight Stale); 4 (Stale); and 5 (Very Stale). The staling data may be reported along with the exposed surface area (i.e., the area of the surface that is exposed to light divided by the total volume of the coated coffee particles or structured coffee compositions. In one or more embodiments, when the structured coffee compositions have an exposed surface to area volume ratio of less than 0.5, the coated coffee particles or structured coffee compositions may be used to prepare a brewed coffee that achieves stale score of 1. Stated differently, the brewed coffee is perceived as not stale. In one or more embodiments, when the structured coffee compositions have an exposed surface to area volume ratio of less than 0.82, the coated coffee particles or structured coffee compositions may be used to prepare a brewed coffee that achieves stale score of 2. Stated differently the brewed coffee is perceived to have a very slight off note.

In one or more embodiments, staling may be determined by aging the coffee under UV lights and testing determining the hexanal content. The coffee may be aged by exposing the structured coffee compositions formed from the coated coffee particles to UV light for a period of 7 days. After the exposure to UV light, the structured coffee compositions may be brewed and the amount of hexanal may be determined. In one or more embodiments, the amount of hexanal after a week of exposure of light in the coated coffee particles may be less than 40 ng/g, in other embodiments less than 35 ng/g, in other embodiments less than 30 ng/g, other embodiments less than 25 ng/g, and in other embodiments less than 35 ng/g.

Packaging and Use:

The structured coffee compositions are intended to be provided to the customer, both consumers and commercial/industrial users, in suitable packages and/or packaging. Due to the resistance to staling of the structured coffee compositions, they allow for reduction of packaging materials and lowers packaging cost. Many types of packages and packaging material can be used for this purpose including bags made from plastic, paper, foil, cellophane or other suitable material; woven and nonwoven filter paper, a nylon mesh material, boxes made from cardboard, rigid plastic, foamed plastic, etc.; bottles, sleeves, etc. Combinations of these packages can also be used. Moreover, the instant coated slurry and/or liquid coffee concentrate can even be used to coat the inside of a package or packaging material for the coffee compositions and/or coffee structures thereof.

If desired, the structured coffee compositions can be packaged in any desired number so that each packaged amount can be designed to yield any desired number of brewed coffee servings and/or strengths. For example, structured coffee compositions are in one embodiment designed to produce a single serving of coffee per coffee composition and/or structures thereof can be packaged individually to facilitate making one cup of coffee in a single brew, in groups of two to facilitate making two cups of coffee in a single brew, in groups of three to facilitate making three cups of coffee in a single brew, in groups of four to facilitate making four cups of coffee in a single brew cycle and so forth up to groups of twelve to facilitate making twelve cups of coffee in a single brew. The structured coffee compositions may be packaged with more or less of the same to produce stronger or weaker coffee for a standard brew of coffee since, in one embodiment, the coffee structures (e.g., pellets, molded products, etc.) can be designed to be dividable, any potentially desired ratio of coffee structures to standard coffee servings can potentially be achieved. Furthermore, in yet other embodiments designed to produce a single serving of coffee per structured coffee composition can be packaged individually as structured coffee composition to facilitate making one cup of coffee in a single brew, or can be packaged in a group of three (3) structured coffee compositions to facilitate making about two (2) to three (3) cups of coffee; or can be packaged in a group of about four (4) structured coffee compositions to facilitate making about four (4) to seven (7) cups of coffee; or can be packaged in a group of even about five (5) structured coffee compositions coffee to facilitate making about eight (8) to twelve (12) cups of coffee.

The packaging for the structured coffee compositions may be designed to be resealable for the convenience of the customer. In such a configuration, as the structured coffee compositions are periodically used by the consumer, the unused structured coffee compositions that remain could be resealed in the package to retain product freshness.

One advantage is that two or more structured coffee compositions may be, via two different coffee compositions or structures formed from each respective different structured coffee composition, combined in the same brew to produce a preferred brew in which the one or more properties resulting from the combination of different coffee compositions or structures provide a desired variation, change or combination in flavor, strength, caffeine content, or other such characteristic in the preferred brew. A wide variety of types of structured coffee compositions can be provided together in a pre-packaged kit, or in a consumer selected array, to facilitate preparation of a preferred brew specific to an individual consumer's preferences. As such, an exemplary kit may include a plurality of varied structured coffee compositions, with at least two of the varied structured coffee compositions having a different predetermined property, such as, for example, amount or type of flavorant, caffeine content, level of acidity, darkness of roast, species of coffee, or type, of coffee bean treatment. Such a kit can be provided with instructions for combining the two or more types of coffee composition to prepare a desired brewed coffee. These instructions may include one or more "recipes" for preparing one or more special predetermined blends of coffee. The present invention may be packaged as coffee compositions (if in loose powdered form) and/or as an appropriate number of structured coffee compositions. See various methods of packaging and use of coffee compositions and products as disclosed in U.S. Pat. Nos. 9,756,869; 9,603,376; 9,474,291; 9,474,290, which these patent applications are hereby incorporated by reference as though fully set forth herein in their entirety.

Structured Coffee Composition Properties:

In accordance with the present invention, the structured coffee compositions are made in such a way that they disintegrate essentially immediately (or at least very rapidly) when contacted with brewing water of a desired and/or suitable temperature (any temperature could be used, e.g., 1° C. to 100° C., as both hot and cold coffee brews are desirable) at the beginning of the brewing cycle, as indicated herein.

Figure 3A:
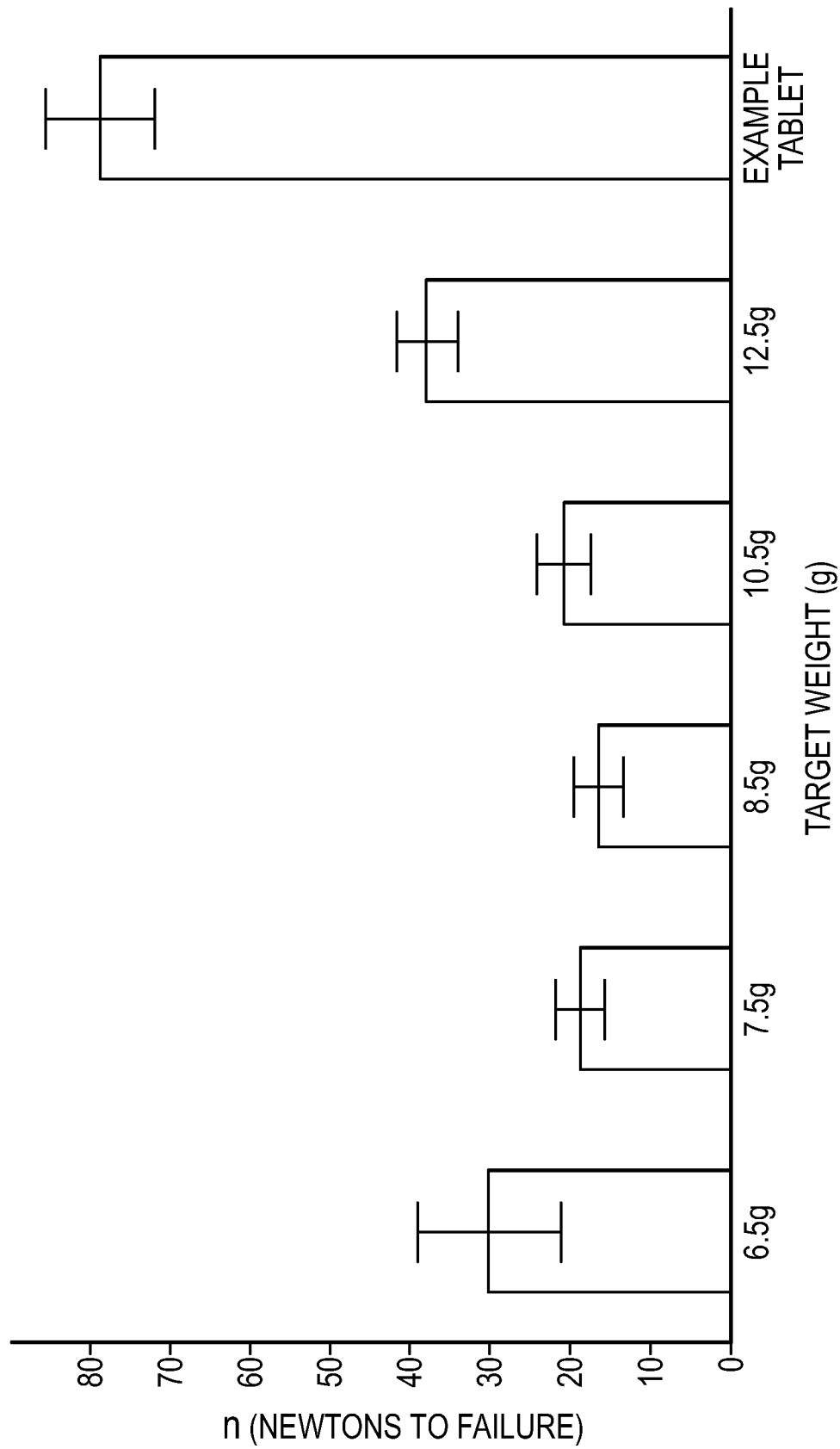
FIG. 3A is another graphical plot of the hardness of various examples of the present invention when tested by breaking the structure across its diameter and including a comparative example of a tablet structure.
Figure 3B:
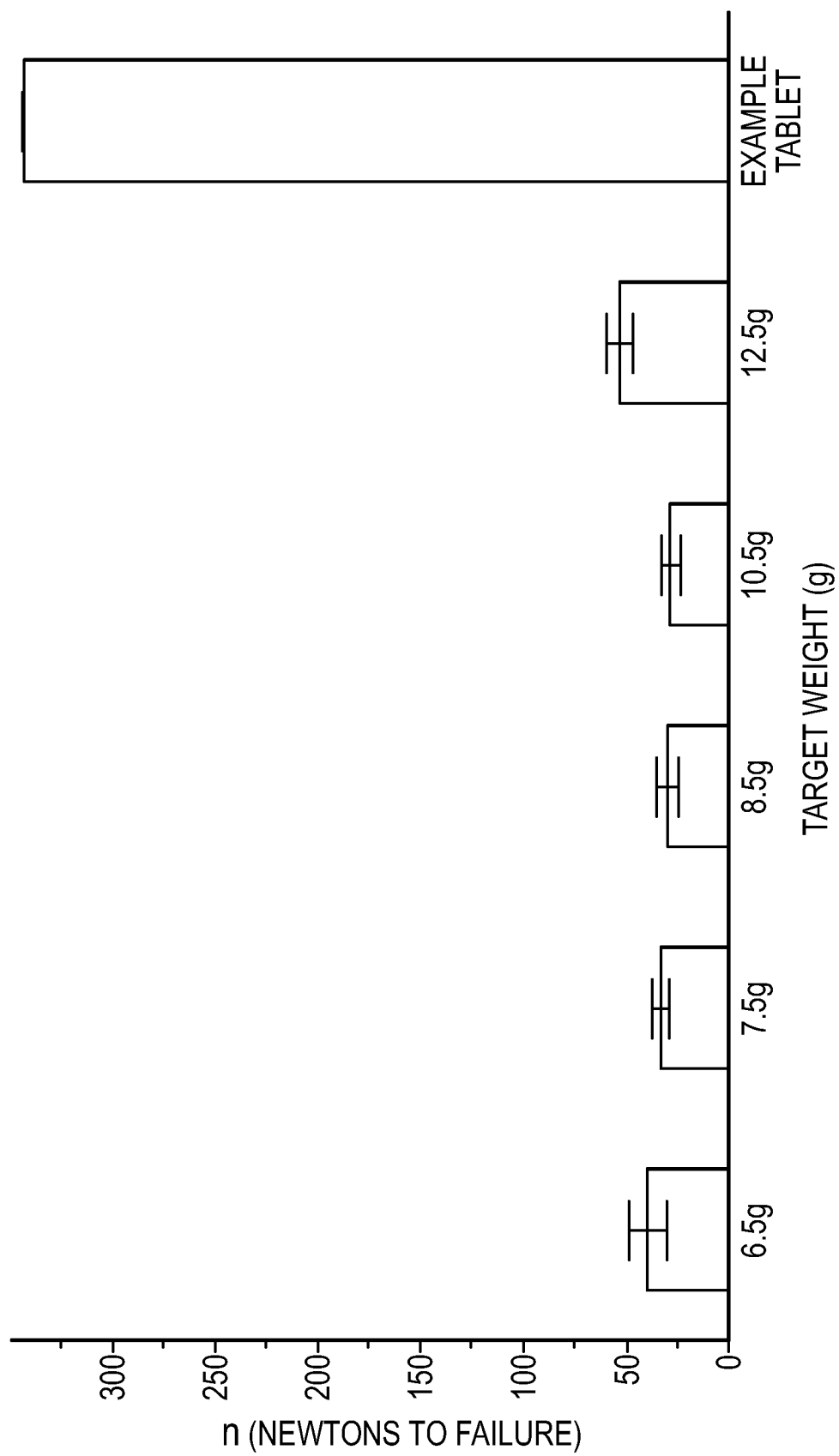
FIG. 3B is another graphical plot of the hardness various examples of the present invention when tested by breaking the structure across its height and including a comparative example of a tablet structure.

The strength/robustness of the structured coffee compositions may conveniently be measured in several ways, two examples of which include measuring a product's hardness and friability. Hardness measures the force required to break the structure in an axial direction over the height of the structure or across the diameter over the radial or longitudinal direction of the structure. Product hardness can be determined by a diametral compression test in which the structure is placed between two anvils and a pressure is applied to the anvils until the structure breaks. The crushing strength that just causes the structure to break is taken as the hardness of the structure, which is sometimes referred to as the "structure crushing strength." The hardness of an article can be determined using any number of devices and techniques known to skilled coffee professionals, including, for example, the Stokes (Monsanto) tester, the Strong-Cobb tester, the Pfizer tester, the Erweka tester, the Heberlein (or Schleuniger) tester, the Key tester, the Varian VK200 Tablet Hardness tester, and the Van der Kamp tester, and the techniques associated with each of these devices. As shown in Table 2 below and FIGS. 3A and 3B, the structured coffee compositions may be made to have a hardness with a structure crushing strength over the height or axial direction of the structure in the range of about 21.3 N (Newtons) to about 61.7 N, when measured using a Varian VK200 Tablet Hardness tester set in the N (Newton) mode. Hardnesses in the range of about 20 N to about 65 N, about 22.5 N to about 62.5 N, about 25 N to about 60 N, about 27.5 N to about 57.5 N, about 30 N to about 55 N, about 32.5 N to about 52.5 N, about 35 N to about 50 N, about 37.5 N to about 47.5 N, about 40 N to about 45 N or even about 42.5 N. The structured coffee compositions may be made to have a hardness with a structure crushing strength over the across the diameter over the radial or longitudinal direction of the structure in the range of about 11.1 N (Newtons) to about 51.6 N, when measured using a Varian VK200 Tablet Hardness tester set in the N (Newton) mode. Hardnesses in the range of about 10 N to about 52.5 N, about 12.5 N to about 50 N, about 15 N to about 45 N, about 17.5 N to about 42.5 N, about 20 N to about 40 N, about 20 N to about 37.5 N, about 22.5 N to about 35 N, about 25 N to about 32.5 N, or even about 30 N.

TABLE 2

| Target Weight | Measurement | Height (mm) | Diameter (mm) | Mass (g) | Surface Area (cm$^2$) | Volume (cm$^3$) | Density (g/cm$^3$) | N (Newtons to failure) |
|---|---|---|---|---|---|---|---|---|
| 6.5 g | Diameter | 19.67 | 30.77 | 6.56 | 33.9 | 14.6 | 0.45 | 19 |
| 6.5 g | Diameter | 19.87 | 30.68 | 6.59 | 33.9 | 14.7 | 0.45 | 51.6 |
| 6.5 g | Height | 19.83 | 30.57 | 6.56 | 33.7 | 14.6 | 0.45 | 61.5 |
| 6.5 g | Height | 19.93 | 30.34 | 6.49 | 33.5 | 14.4 | 0.45 | 31.1 |
| 10.5 g | Diameter | 28.40 | 32.23 | 10.48 | 45.1 | 23.2 | 0.45 | 25.5 |
| 10.5 g | Diameter | 28.42 | 32.35 | 10.51 | 45.3 | 23.4 | 0.45 | 15.6 |
| 10.5 g | Height | 28.56 | 31.72 | 10.51 | 44.3 | 22.6 | 0.47 | 21.3 |
| 10.5 g | Height | 28.05 | 31.37 | 10.47 | 43.1 | 21.7 | 0.48 | 34.2 |
| 8.5 g | Diameter | 23.86 | 31.60 | 8.49 | 39.4 | 18.7 | 0.45 | 11.1 |
| 8.5 g | Height | 24.24 | 31.36 | 8.50 | 39.3 | 18.7 | 0.45 | 22.1 |
| 8.5 g | Height | 23.51 | 31.61 | 8.45 | 39.0 | 18.5 | 0.46 | 37.8 |
| 7.5 g | Diameter | 21.78 | 30.91 | 7.5 | 36.2 | 16.3 | 0.46 | 23.3 |
| 7.5 g | Diameter | 21.72 | 31.37 | 7.48 | 36.9 | 16.8 | 0.45 | 13 |
| 7.5 g | Height | 21.08 | 31.33 | 7.52 | 36.2 | 16.3 | 0.46 | 26.6 |
| 7.5 g | Height | 21.96 | 31.05 | 7.53 | 36.6 | 16.6 | 0.45 | 40.3 |
| 12.5 g | Diameter | 31.62 | 32.32 | 12.56 | 48.5 | 25.9 | 0.48 | 43.4 |
| 12.5 g | Diameter | 32.35 | 32.54 | 12.55 | 49.7 | 26.9 | 0.47 | 31.1 |
| 12.5 g | Height | 31.58 | 32.66 | 12.52 | 49.2 | 26.5 | 0.47 | 42.5 |
| 12.5 g | Height | 31.29 | 31.98 | 12.52 | 47.5 | 25.1 | 0.50 | 61.7 |
| Tablet Example | Diameter | 5.94 | 25.59 | 2.74 | 15.1 | 3.1 | 0.90 | 67.7 |
| Tablet Example | Diameter | 5.97 | 25.59 | 2.86 | 15.1 | 3.1 | 0.93 | 92.1 |
| Tablet Example | Height | 6.02 | 25.58 | 2.80 | 15.1 | 3.1 | 0.91 | 343 |
| Tablet Example | Height | 5.81 | 25.55 | 2.62 | 14.9 | 3.0 | 0.88 | 343 |

Figure 4:
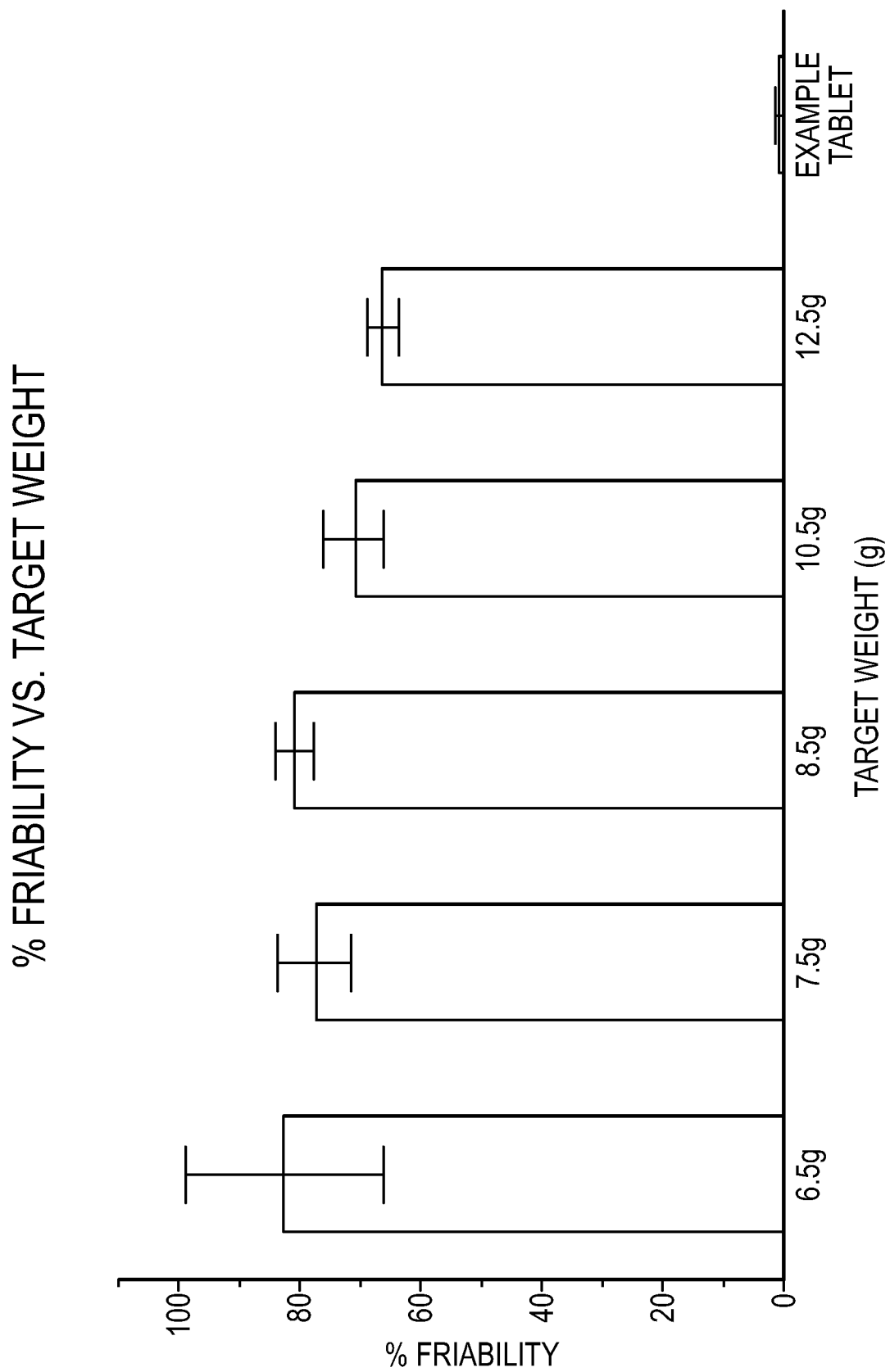
FIG. 4 is another graphical plot of the percent friability of various examples of structured coffee compositions and including a comparative example of a tablet structure.
Figure 5:
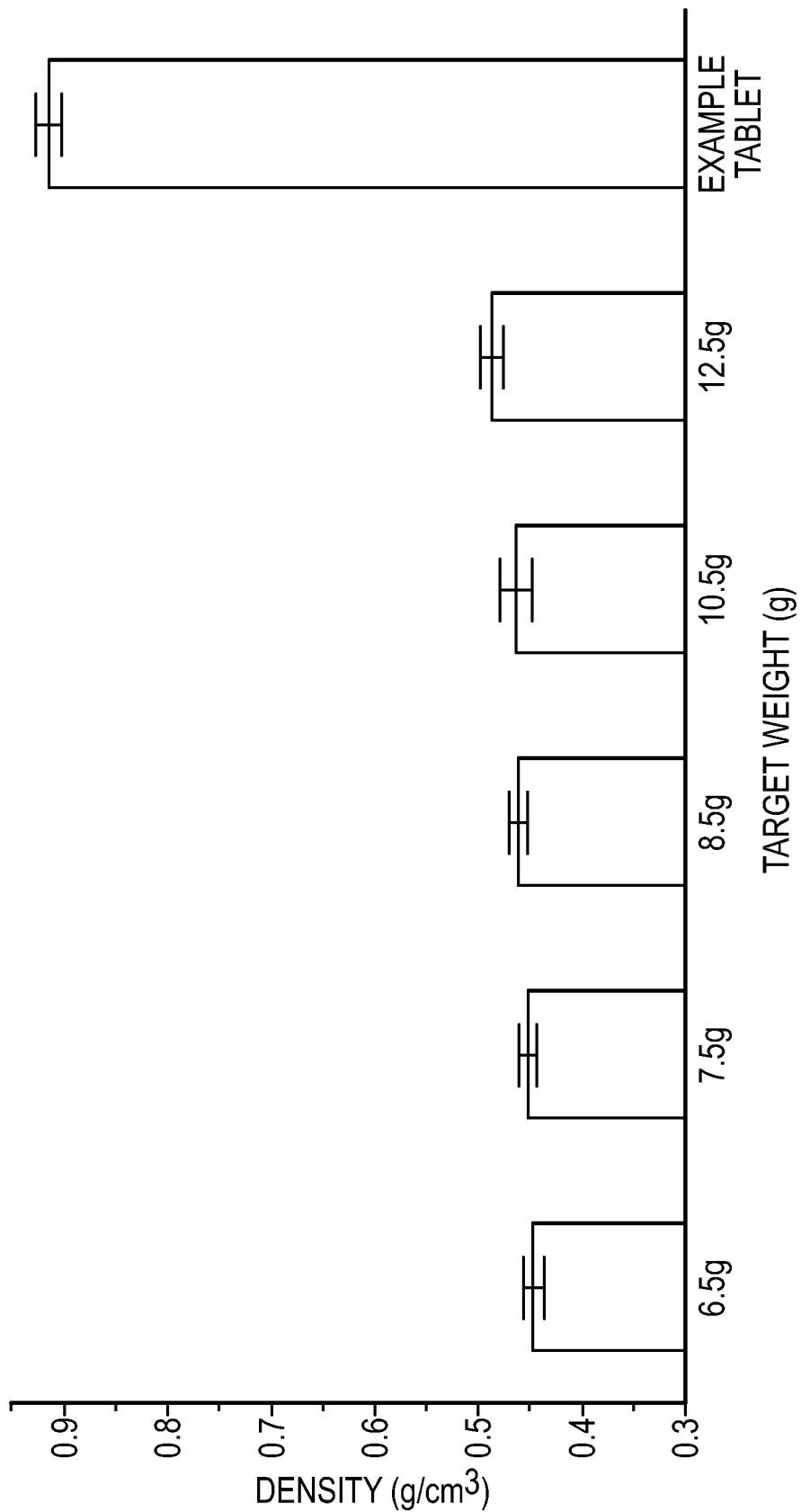
FIG. 5 is a graphical plot of the density of various examples of the structured coffee compositions and including a comparative example of a tablet structure.
Figure 6:
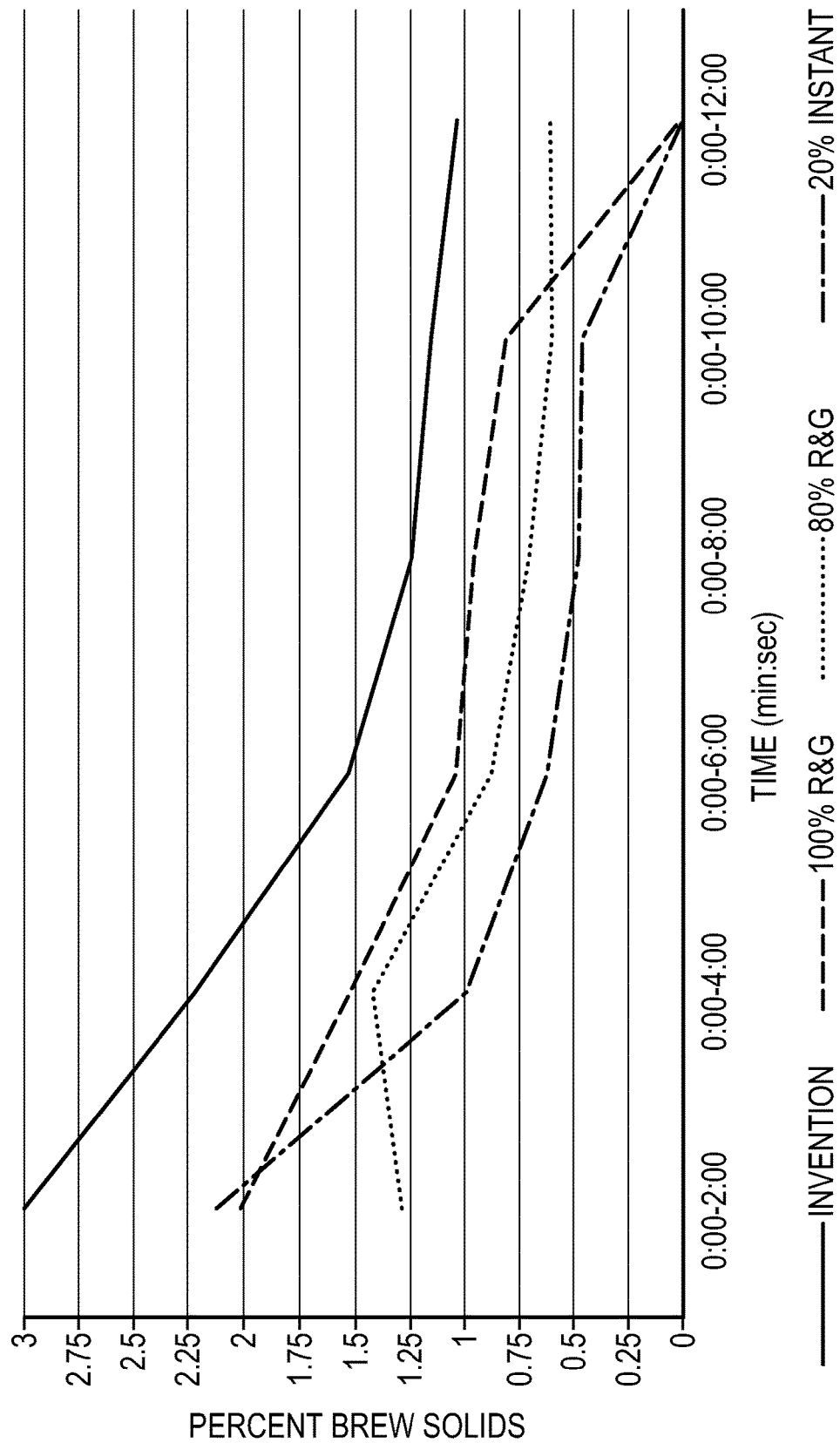
FIG. 6 is a graphical plot of the brew solids present after brewing the structured coffee compositions as compared to its various constituents individually for cumulative brew lengths in an ADC brew method.
Figure 7:
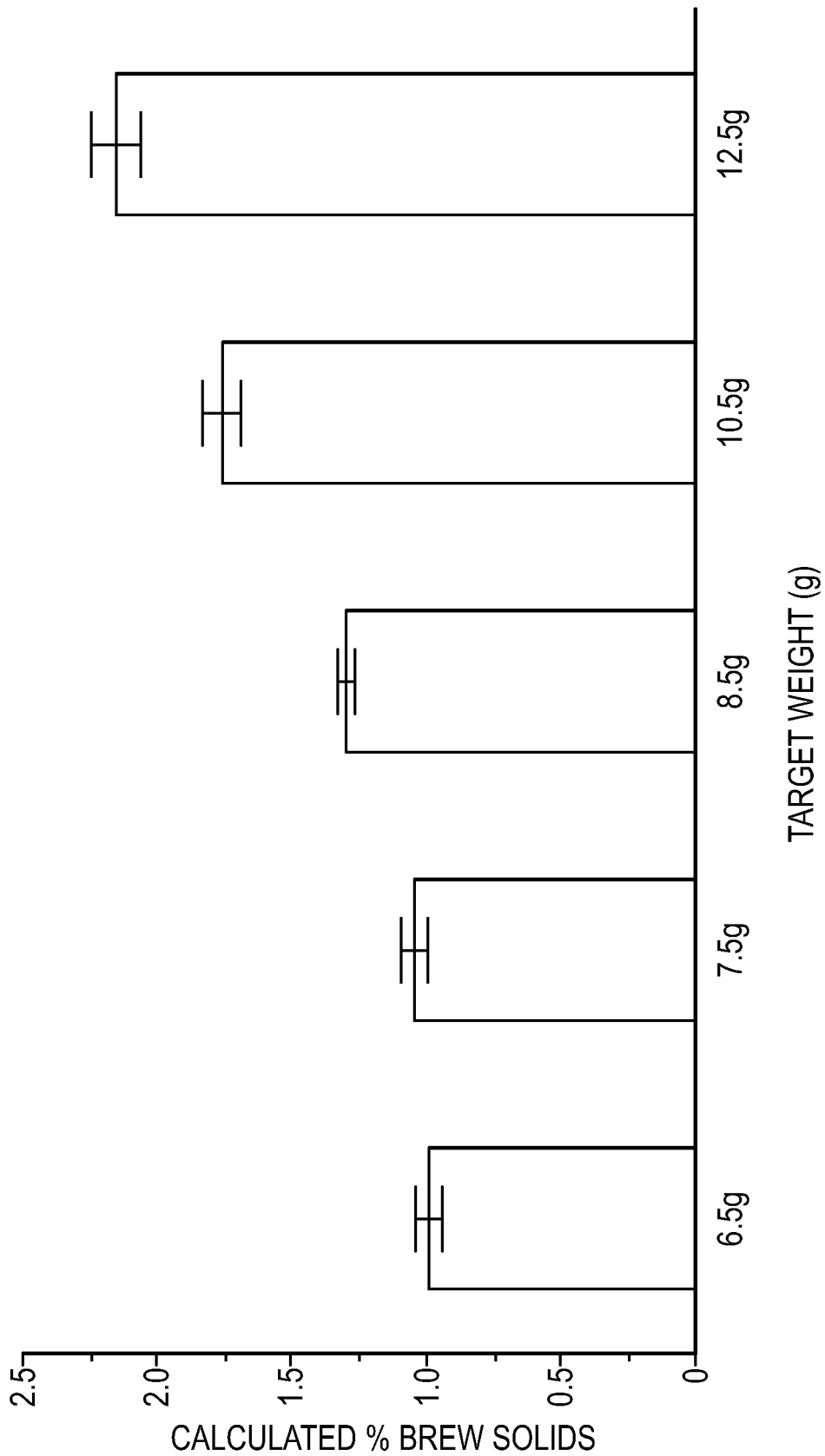
FIG. 7 is a graphical plot of the brew solids present after brewing various examples of the structured coffee compositions.
Figure 8:
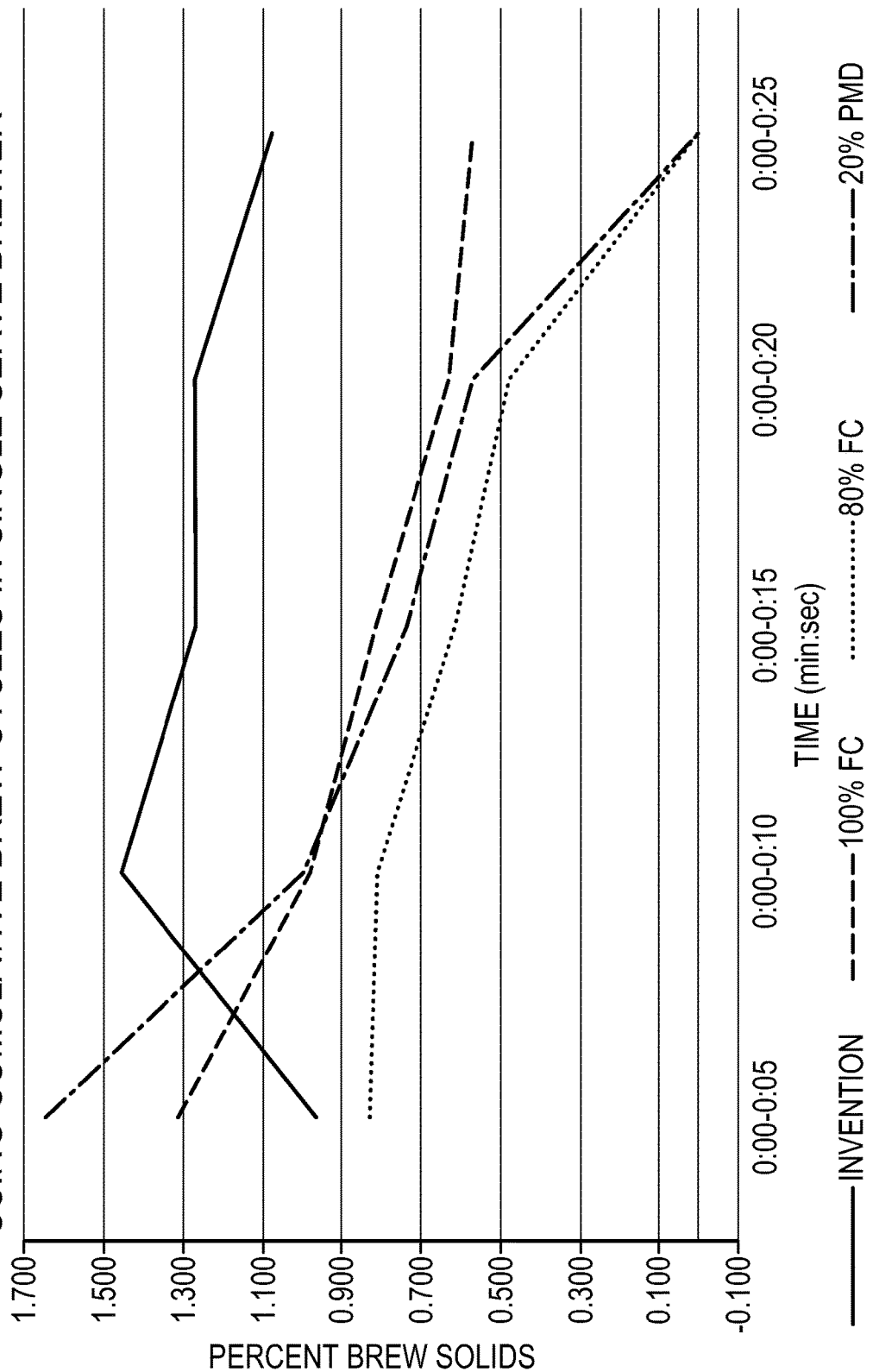
FIG. 8 is a graphical plot of the brew solids present after brewing structured coffee compositions as compared to its various constituents individually for cumulative brew lengths in a Single serve brewer.
Figure 9:
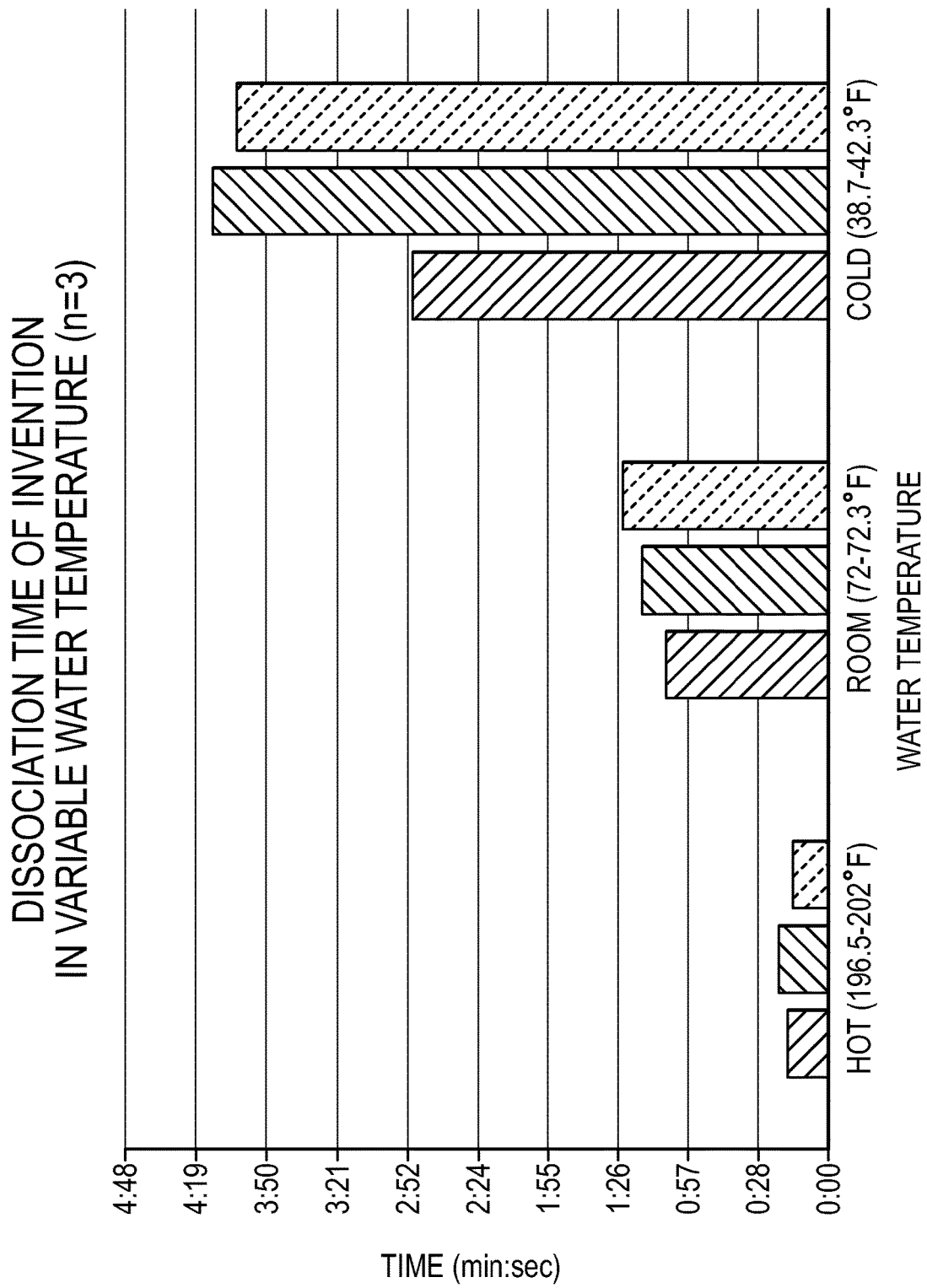
FIG. 9 is a graphical plot of the disassociation time of the structured coffee compositions in various water temperatures.

Friability measures the amount of material that flakes, falls, or chips off the structures after being tumbled under a predetermined set of conditions. For convenience, the friability of the structured coffee compositions can be measured using a commercially-available Varian Friabilator having a dual chamber friability drum by rotating the structure in the drum of the machine for 100 revolutions at a rate of 25 rpm and then determining the amount of these structures that passes through a #4 American Standard Wire Mesh screen. The structures should not be broken to obtain the weight of the structure in grams, but adjust the number of whole structures to come as close as possible to weight of the structure in grams. The weight of material passing through this screen in proportion to the total weight of the original charge of structures represents the friability of these structures. As shown in Table 3 below and in FIG. 4, it has been found that the structured coffee compositions can have a friability in the range of about 50 to 55 percent to about 100 percent (total disintegration of the coffee structure), of about 57.5 percent to about 97.5 percent, of about 60 percent to about 95 percent, of about 62.5 percent to about 92.5 percent, of about 65 percent to about 90 percent, of about 67.5 percent to about 87.5 percent, of about 70 percent to about 85 percent, of about 72.5 percent to about 82.5 percent, of about 75 percent to about 80 percent, or even about 77.5 percent.

TABLE 3

| Target Weight (g) | Sample No. | Chamber | Whole Mass (g) | End Mass (g) (retained in #4 screen) | Percent Friability | Diameter mm | Height mm | Volume (cm$^3$) | Density (g/cm$^3$) |
|---|---|---|---|---|---|---|---|---|---|
| 6.5 | 3 | 1 | 6.32 | 0.00 | 100 | 30.56 | 20.20 | 14.8 | 0.43 |
| 6.5 | 5 | 1 | 6.47 | 2.12 | 67 | 30.59 | 19.61 | 14.4 | 0.45 |
| 10.5 | 4 | 2 | 10.56 | 3.79 | 64 | 32.01 | 27.76 | 22.3 | 0.47 |
| 10.5 | 6 | 2 | 10.53 | 2.15 | 80 | 32.08 | 27.75 | 22.4 | 0.47 |
| Tablet Example | 1 | 1 | 2.86 | 2.86 | 0 | | | | |
| Tablet Example | 7 | 1 | 2.69 | 2.61 | 3 | | | | |
| 12.5 | 5 | 1 | 12.54 | 4.76 | 62 | 31.66 | 30.92 | 24.3 | 0.52 |
| 12.5 | 8 | 2 | 12.49 | 3.68 | 71 | 32.55 | 31.69 | 26.4 | 0.47 |
| 8.5 | 9 | 1 | 8.54 | 1.07 | 88 | 31.50 | 23.53 | 18.3 | 0.47 |
| 7.5 | 2 | 2 | 7.54 | 1.18 | 84 | 31.38 | 21.89 | 16.9 | 0.45 |
| 7.5 | 7 | 1 | 7.52 | 2.41 | 68 | 31.29 | 21.48 | 16.5 | 0.46 |

TABLE 4

| Final Weight (g) | Number of Samples | Mean Water Activity Value | Minimum Value Percent | Maximum Value | Range |
|---|---|---|---|---|---|
| 6.5 | 10 | 0.36 | 0.35 | 0.40 | 0.05 |
| 7.5 | 10 | 0.42 | 0.41 | 0.42 | 0.01 |
| 8.5 | 10 | 0.39 | 0.39 | 0.40 | 0.01 |
| 10.5 | 10 | 0.39 | 0.01 | | 0.40 |
| 12.5 | 10 | 0.38 | 0.38 | 0.38 | — |

In one or more embodiments, the coated coffee particles may be characterized by a water activity. Water activity may be determined using a water activity meter such as a Rotronic Hygrolab Water Activity Meter. In one or more embodiments, structured coffee compositions may have a water activity of about 0.35 to about 0.42, about 0.36 to about 0.41, about 0.37 to about 0.40, and to about 0.38 to about 0.39, or even about 0.385. Furthermore, as shown in Table 4 (water activity data) above, the structured coffee compositions having the above combination of properties of about stated values and/or within claimed ranges for hardness, friability, and density within the diameter and height measurements and the about stated target weights may have a water activity of about 0.35 to about 0.42, about 0.36 to about 0.41, about 0.37 to about 0.40, and to about 0.38 to about 0.39, or even about 0.385.

It has been further found that the structured coffee compositions achieve a greater total extraction of coffee solids during brewing as compared to an otherwise conventional ground roast coffee composition. That is to say, the total percent of total volume) in the structured coffee compositions may greater than 40%, greater than 42.5%, greater than 45% or greater than 47.5%, or greater than 50%, or greater than 52.5%, or greater than 55%, or greater than 57.5%, or greater than 60%. In one or more embodiments, the percent porosity in the structured coffee compositions may range between from about 40% to about 80%, or from about 42.5% to about 77.5%, or from about 45% to about 75%, or from about 47.5% to about 72.5%, or from about 50% to about 70%, or from about 52.5% to about 67.5%, or from about 55% to about 65%, or from about 57.5% to about 62.5%, or even about 60%. See FIGS. 12A through 13B for depictions of cross sections of cylindrical and spherical molded products of exemplary embodiments of the structured coffee compositions which depicts the Micro-CT of the porosity in structured coffee compositions. Various samples of structures with various particle size distribution of roast and ground coffee, shapes, and grind sizes were studied as shown below in Tables 5 and 6 below.

TABLE 5

| Sample ID | Shape | Grind | Particle size distribution of R&G $X_{50}$ μm | Particle size distribution of R&G $X_{90}$ μm | Bulk Density (g/cc) | Refractive Index (20° C.) | Brewed Soluble Solids (%) | Porosity (Percent total volume) |
|---|---|---|---|---|---|---|---|---|
| A-1 | Cylinder | Fine Grind | 451 | 842 | 0.57 | 1.333 | 0.78 | 65.8% |
| A-2 | Cylinder | Fine Grind | 442. | 835 | 0.55 | 1.333 | 0.72 | |
| A-3 | Cylinder | Fine Grind | 455 | 842 | 0.56 | 1.334 | 0.82 | |
| B-1 | Cylinder | Medium Grind | 1056 | 1655 | 0.47 | 1.334 | 1.06 | 73.2% |
| B-2 | Cylinder | Medium Grind | 1039 | 1654 | 0.48 | 1.334 | 1.08 | |
| B-3 | Cylinder | Medium Grind | 1023 | 1641 | 0.47 | 1.335 | 1.39 | |
| C-1 | Cylinder | Coarse Grind | 1436 | 2123 | 0.40 | 1.335 | 1.44 | 76.6% |
| C-2 | Cylinder | Coarse Grind | 1527 | 2441 | 0.40 | 1.334 | 1.22 | |
| C-3 | Cylinder | Coarse Grind | 1465 | 2458 | 0.390 | 1.334 | 1.29 | | amount of coffee solids extracted and recovered in the brewed coffee product obtained is greater when the structured coffee composition is used in a typical ADC coffee maker or other brewing devices than when the same amount of conventional ground roast coffee is used in the same coffee maker. This feature is illustrated in the following Working Examples, Examples #1 through #4, Tables 5, 7, 8, 10 through 12, and as shown in FIGS. 6 through 9, which show that the yield ratios provided by the structured coffee compositions, i.e., the ratio of the coffee solids recovered from brewing the structured coffee compositions relative to the coffee solids recovered from brewing a substantially equal amount of conventional ground roast coffee (e.g., the ground roast coffee used to prepare the structured coffee composition) is normally greater than about 1 and in many instances greater than about 1.1, greater than about 1.2, greater than about 1.25, greater than about 1.5, greater than about 1.75, greater than about 2, greater than about 2.25, greater, than about 2.5, greater than about 2.75, and even about 3 on a weight basis.

As discussed herein, various particle sizes for the roast and ground coffee may be used, which may result in various percent brew solids, density, and percent porosity in the molded product. Porosity is measured by Micro-CT (also called microtomography or micro-computed tomography). In one or more embodiments, the percent porosity (i.e.,

TABLE 6

| Molded Product Shape | Average Porosity | Range of Porosity | Number Samples Assessed |
|---|---|---|---|
| Sphere | 53.2% | 59.5-46.9% | 2 |
| Cylinder | 54.2% | 59.0-49.6% | 3 |

In light of the above, when a standard serving of coffee is prepared the percent brew solids achieved by the structed coffee compositions are in the range of about 0.90 weight percent to about 3.00 weight percent, or from about 0.95 weight percent to about 2.95 weight percent, about 1.00 weight percent to about 2.9 weight percent, or from about 1.05 weight percent to about 2.85 weight percent, or from about 1.10 weight percent to about 2.80 weight percent, about 1.15 weight percent to about 2.75 weight percent, or from about 1.20 weight percent to about 2.70 weight percent, about 1.25 weight percent to about 2.65 weight percent, about 1.30 weight percent to about 2.60 weight percent, about 1.35 weight percent to about 2.55 weight percent, about 1.40 weight percent to about 2.50 weight percent, about 1.45 weight percent to about 2.45 weight percent, about 1.50 weight percent to about 2.40 weight percent, about 1.55 weight percent to about 2.35 weight percent, about 1.60 weight percent to about 2.30 weight percent, about 1.65 weight percent to about 2.25 weight percent, about 1.70 weight percent to about 2.20 weight percent, about 1.75 weight percent to about 2.15 weight percent, about 1.80 weight percent to about 2.10 weight percent, about 1.85 weight percent to about 2.05 weight percent, about 1.90 weight percent to about 2.00 weight percent, or even about 1.95 weight percent, based on the weight of the coffee brewed. For measurement of the percent (%) brew solids (% BS) used herein the refractive index (RI) is measured using Bellingham Stanley RFM 340+. RI is the raw data value that is generated by the refractometer, it is used to calculate percent (%) brew solids. Then a linear regression equation is developed and used to correlate the RI to % BS.

WORKING EXAMPLES

Working Example 1

Automatic Drip Coffee (ADC) maker examples were completed with the present invention and its various constituents for determining the amount of brew solids present in the coffee brew. For all ADC brew methods 1420 mL of PUR filtered tap water was used. Molded or formed coffee structures/products used four 8.5 gram pellets (34 grams in total) of the structured coffee compositions (made with Folgers Classic roast and ground coffee and Colcafe PMD instant coffee), Folgers Classic roast and ground used 34 grams, and Colcafe PMD instant coffee used 6.8 grams for the various coffee brews thereof. The first brewing method took data points every 2 minutes throughout the duration of the brew, i.e., cumulative brew cycles, which is shown in Table 7 and FIG. 6. Samples were taken by cycling beakers under the drip spout. Total weight of each beaker was taken prior to collecting a sample. A total of 3 replicates were collected using this method. This method was used to show the extraction strength of a brew at each time point and to demonstrate the total strength of the brew as the extraction time increases.

TABLE 7

| Type | Brew Time Interval (min:sec) | Approximate Original Weight (g) | Percent Brew Solids |
|---|---|---|---|
| Invention | 0:00-2:00 | 34 | 3.00 |
| Invention | 0:00-4:00 | 34 | 2.22 |
| Invention | 0:00-6:00 | 34 | 1.53 |
| Invention | 0:00-8:00 | 34 | 1.24 |
| Invention | 0:00-10:00 | 34 | 1.15 |
| Invention | 0:00-12:00 | 34 | 1.04 |
| 100% R&G | 0:00-2:00 | 34 | 2.02 |
| 100% R&G | 0:00-4:00 | 34 | 1.52 |
| 100% R&G | 0:00-6:00 | 34 | 1.03 |
| 100% R&G | 0:00-8:00 | 34 | 0.95 |
| 100% R&G | 0:00-10:00 | 34 | 0.81 |
| 100% R&G | 0:00-12:00 | 34 | N/A |
| 80% R&G | 0:00-2:00 | 27.2 | 1.28 |
| 80% R&G | 0:00-4:00 | 27.2 | 1.42 |
| 80% R&G | 0:00-6:00 | 27.2 | 0.87 |
| 80% R&G | 0:00-8:00 | 27.2 | 0.71 |
| 80% R&G | 0:00-10:00 | 27.2 | 0.60 |
| 80% R&G | 0:00-12:00 | 27.2 | 0.61 |
| 20% Instant | 0:00-2:00 | 6.8 | 2.12 |
| 20% Instant | 0:00-4:00 | 6.8 | 0.99 |
| 20% Instant | 0:00-6:00 | 6.8 | 0.62 |

TABLE 7-continued

| Type | Brew Time Interval (min:sec) | Approximate Original Weight (g) | Percent Brew Solids |
|---|---|---|---|
| 20% Instant | 0:00-8:00 | 6.8 | 0.48 |
| 20% Instant | 0:00-10:00 | 6.8 | 0.47 |
| 20% Instant | 0:00-12:00 | 6.8 | N/A |

Working Example 2

Table 8 below details various comparisons of various coffee brews made with roast and ground coffee and the structured coffee compositions with various methods of brewing using different brewers and the brew solids such coffee brews yield using the same or substantially similar brewing conditions.

TABLE 8

| Type | Brewer | Drop Weight (g) | Percent Brew Solids-Roast & Ground | Percent Brew Solids-Invention |
|---|---|---|---|---|
| Folgers Classic | Single Serve | 8.5 | 0.6 | 1.0 |
| Dunkin Original | Single Serve | 8.5 | 0.5 | 1.1 |
| Black Silk | Single Serve | 8.5 | 0.7 | 1.2 |
| Supreme Bustelo | Single Serve | 8.5 | 0.6 | 1.4 |
| Folgers Classic | Ninja | 8.5 | 0.6 | 1.0 |
| Classic Decaf | Ninja | 8.5 | 0.5 | 0.9 |
| Bustelo | Ninja | 8.5 | 0.4 | 0.9 |
| Caramel Drizzle | Ninja | 8.5 | 0.6 | 0.9 |
| Dunkin Original | ADC | 34 | 0.6 | 0.9 |
| Black Silk | ADC | 34 | 0.7 | 0.9 |
| Flaked Black Silk | ADC | 34 | 0.9 | 1.1 |
| Classic Turkish | ADC | 34 | 0.8 | 1.2 |

Working Example 3

Tables 9 and 10 detail control samples of various target weight structures of the present invention at about 6.5 grams, about 7.5 grams, about 8.5 grams, about 10.5 grams, and about 12.5 grams. Molded or formed coffee structures/products used the structured coffee compositions made with Folgers Classic roast and ground and Colcafe PMD instant coffee for the various coffee brews thereof. There were about ten (N=10) replicates of each coffee structure that were analyzed for percent brew solids (% BS or percent (%) brew solids). The refractive index (RI) of the brewed coffee sample was measured using Bellingham Stanley RFM 340+, temperature set to 29. RI is the raw data value that is generated by the refractometer, it is used to calculate percent (%) brew solids. The percent (%) brew solids was calculated using the following equation percent (%) brew solids= (RI*549.209)−731.575. See Tables 8 and 9, and FIG. 7.

TABLE 9

| Target Weight (g) | Number of Samples | Mean RI | Minimum RI | Maximum RI |
|---|---|---|---|---|
| 6.5 | 10 | 1.33 | 1.33 | 1.33 |
| 7.5 | 10 | 1.33 | 1.33 | 1.33 |
| 8.5 | 10 | 1.33 | 1.33 | 1.34 |
| 10.5 | 10 | 1.34 | 1.34 | 1.34 |
| 12.5 | 10 | 1.34 | 1.34 | 1.34 |

TABLE 10

| Target Weight (g) | Number of Samples | Mean Percent Brew Solids | Minimum Percent Brew Solids | Maximum Percent Brew Solids |
|---|---|---|---|---|
| 6.5 | 10 | 0.98 | 0.91 | 1.06 |
| 7.5 | 10 | 1.05 | 0.98 | 1.11 |
| 8.5 | 10 | 1.30 | 1.26 | 1.34 |
| 10.5 | 10 | 1.76 | 1.60 | 1.83 |
| 12.5 | 10 | 2.15 | 2.00 | 2.30 |

Working Example 4

Single serve brewer examples were completed with control samples of the present invention and its various constituents for determining the amount of brew solids present in the coffee brew. For all single serve brew methods, the examples were completed on the standard cup setting using PUR filtered tap water. Molded or formed coffee structures/products used one 8.5 gram pellet (made from Folgers Classic roast and ground and Colcafe PMD instant coffee), one 8.5 gram Folgers Classic roast and ground pellet, or 1.7 grams Colcafe PMD of instant coffee. The first brew method took individual samples in 10 second intervals throughout the duration of the brew cycle, i.e., cumulative brew cycles, which is shown in Table 10 and FIG. 8. Total weight of each beaker was taken prior to collecting a sample. A total of 3 replicates were conducted using this method. This method was used to show the extraction strength of a brew at each time point. The second brew method brewed coffee structures at incremental extraction times, the extraction was stopped at 20, 30, 40, and 50 seconds, i.e., individual brew lengths, which is shown in Table 12. For each time point a new brew was run. Whereas with the previous method multiple samples were taken per brew, with this method only one data point was taken per brew. A single replicate was used for this method. This method was used to demonstrate the total strength of the brew as the extraction time increases.

TABLE 11

| Type | Brew Time Interval (min:sec) | Approximate Original Weight (g) | Percent Brew Solids |
|---|---|---|---|
| Invention | 0:00-0:05 | 8.50 | 0.96 |
| Invention | 0:00-0:10 | 8.50 | 1.46 |
| Invention | 0:00-0:15 | 8.50 | 1.27 |
| Invention | 0:00-0:20 | 8.50 | 1.27 |
| Invention | 0:00-0:25 | 8.50 | 1.08 |
| 100% R&G | 0:00-0:05 | 8.50 | 1.32 |
| 100% R&G | 0:00-0:10 | 8.50 | 0.99 |
| 100% R&G | 0:00-0:15 | 8.50 | 0.81 |
| 100% R&G | 0:00-0:20 | 8.50 | 0.63 |
| 100% R&G | 0:00-0:25 | 8.50 | 0.57 |
| 100% R&G | 0:00-0:05 | 6.80 | 0.83 |
| 100% R&G | 0:00-0:10 | 6.80 | 0.81 |
| 100% R&G | 0:00-0:15 | 6.80 | 0.61 |
| 100% R&G | 0:00-0:20 | 6.80 | 0.48 |
| 100% R&G | 0:00-0:25 | 6.80 | N/A |
| 20% Instant | 0:00-0:05 | 1.70 | 1.65 |
| 20% Instant | 0:00-0:10 | 1.70 | 1.00 |
| 20% Instant | 0:00-0:15 | 1.70 | 0.74 |
| 20% Instant | 0:00-0:20 | 1.70 | 0.57 |
| 20% Instant | 0:00-0:25 | 1.70 | N/A |

TABLE 12

| Brew Method | Sample | Target Weight Before Test (g) | Brew Time Interval (min:sec) | Percent Brew Solids |
|---|---|---|---|---|
| Single Serve | Invention | 8.32 | 0:00-0:20 | 1.30 |
| Single Serve | Invention | 8.44 | 0:00-0:30 | 1.49 |
| Single Serve | Invention | 8.45 | 0:00-0:40 | 1.15 |
| Single Serve | Invention | 8.46 | 0:00-0:50 | 1.09 |

Working Example 5

Control samples of cold brew coffee brewed with conventional cold brew formulations are compared to quick cold brew formulation made with the present invention. Conventional cold brew formulations used the Dunkin Donuts' Cold Brew retail formula for the control samples. The present invention used the Dunkin'Donuts Cold Brew retail formula for roast and ground and Colcafe PMD instant coffee for the quick cold brew (QCB) formulations. Two different quick cold brew tests examples were run, one using ten (10) 8.5 gram target weight invention structures and the other using four (4) 8.5 gram target weight invention structures. The coffee was encased in standard filter paper pods for brewing. The ten count brew process yielded a coffee that was deemed too strong flavor-wise for most people and is better over ice. The four count brew process with a brew time of 2 hours yielded a coffee that was preferred by people in terms of strength, smooth taste, and character. The present invention when used for quick cold brew coffee provides a bold cold brew coffee strength to remain bold when served over ice. It uses less coffee and brews in a shorter time frame than conventional cold brew formulations to provide a consistent brew. The percent brew solids for the cold brew tests are shown in Table 13 below. Cold brew disassociation examples were also performed as well. A large pitcher was filled with 1700 ml of PUR filtered room temperature water. For the present invention, eight (8) pellets were weighed out for a total of approximately 70 grams, 70 grams for roast and ground, and 13.6 grams for instant coffee. The coffee was encased in standard filter paper pods for brewing. Each sample steeped for a total time of 3 hours with extractions taken at every 30 minute period for percent brew solids (% BS) analysis. A total of 3 replicates were conducted using this method. The present invention used for cold brew coffee disassociates and brews rapidly in both room temperature and cold water applications, which is shown in Table 14 and FIG. 9. The present invention disassociates in hot water (196.5-202° F.) in about 15 to about 21 seconds, in room temperature water (72-72.3° F.) in about 1 minute 7 seconds to about 1 minute 24 seconds, and in cold water (38.7-42.3° F.) in about 2 minutes 51 seconds to about 4 minutes 12 seconds.

TABLE 13

| Sample | Coffee weight (grams) | Brew size (ounces) | g/oz Brewed | Brew Time (hours) | Percent Brew Solids |
|---|---|---|---|---|---|
| Control | 120 | 56 | 2.5 | 15 | 1.7 |
| Control | 60 | 24 | 2.5 | 15 | 0.9 |
| 10X of 8.5 gram Inventive composition/structure (Flavor strength slightly too strong. Better over ice.) | 85 | 56 | 1.8 | 3 | 1.5 |
| 4X of 8.5 gram Inventive composition/structure (Preferred for strength, smooth taste, and character.) | 34 | 24 | 1.4 | 2 | 1.3 |
| 4X of 8.5 gram Inventive composition/structure | 34 | 24 | 1.4 | 3 | 1.4 |
| 4X of 8.5 gram Inventive composition/structure | 34 | 24 | 1.4 | 4 | 1.5 |

TABLE 14

| Trial | Water Temp (° F.) | Structure Weight (g) | Dissociation Time (min:sec) | Average Dissociation Time (min:sec) |
|---|---|---|---|---|
| Hot (196.5-202° F.) | 198 | 8.49 | 0:17 | |
| Hot | 196.5 | 8.44 | 0:21 | |
| Hot | 202 | 8.45 | 0:15 | 0:17 |
| Room (72-72.3° F.) | 72.3 | 8.49 | 1:07 | |
| Room | 72 | 8.44 | 1:17 | |
| Room | 72.1 | 8.48 | 1:24 | 1:16 |
| Cold (38.7-42.3° F.) | 40.7 | 8.47 | 2:51 | |
| Cold | 38.7 | 8.47 | 4:12 | |
| Cold | 42.3 | 8.47 | 4:03 | 3:42 |

Multiple Brewer Working Example: In this study, a single 8.5 gram formed composition of the present invention was brewed using either 6 ounces (oz.) or 8 ounces of water in the brewing method and following the standard instructions for each brewer type modified to the volume of water. The results showed in Table 15 that all the brewed coffee samples, which were done in triplicate, yielded over 1.0 percent brew solids in the final cup. This shows that the current invention yields a stronger cup on average with respect to soluble brew solids, as compared to current roast and ground products. These current products will yield closer to an average of 0.65 percent to 0.95 percent brew solids in the same brewing methods.

TABLE 15

| Sample Number | Brew Method | Oz. Water | Refractive Index | Percent Brew Solids |
|---|---|---|---|---|
| 1 | Keurig Select | 6 | 1.33 | 1.34 |
| 2 | Keurig Select | 6 | 1.33 | 1.33 |
| 3 | Keurig Select | 6 | 1.33 | 1.29 |
| 4 | French Press | 6 | 1.34 | 2.52 |
| 5 | French Press | 6 | 1.34 | 1.65 |
| 6 | French Press | 6 | 1.34 | 1.71 |
| 7 | Mr. Coffee ADC | 6 | 1.34 | 2.66 |
| 8 | Mr. Coffee ADC | 6 | 1.34 | 2.04 |
| 9 | Mr. Coffee ADC | 6 | 1.34 | 1.94 |
| 10 | Tea Diffuser | 6 | 1.33 | 1.04 |
| 11 | Tea Diffuser | 6 | 1.33 | 1.22 |
| 12 | Tea Diffuser | 6 | 1.34 | 1.38 |
| 13 | Chemex PourOver | 6 | 1.33 | 1.59 |
| 14 | Chemex PourOver | 6 | 1.33 | 1.19 |
| 15 | Chemex PourOver | 6 | 1.33 | 1.20 |
| 16 | Ninja Brewer | 8 | 1.33 | 1.16 |
| 17 | Ninja Brewer | 8 | 1.33 | 1.15 |
| 18 | Ninja Brewer | 8 | 1.34 | 1.15 |
| 19 | Keurig Select | 8 | 1.14 | 1.18 |

Figure 10:
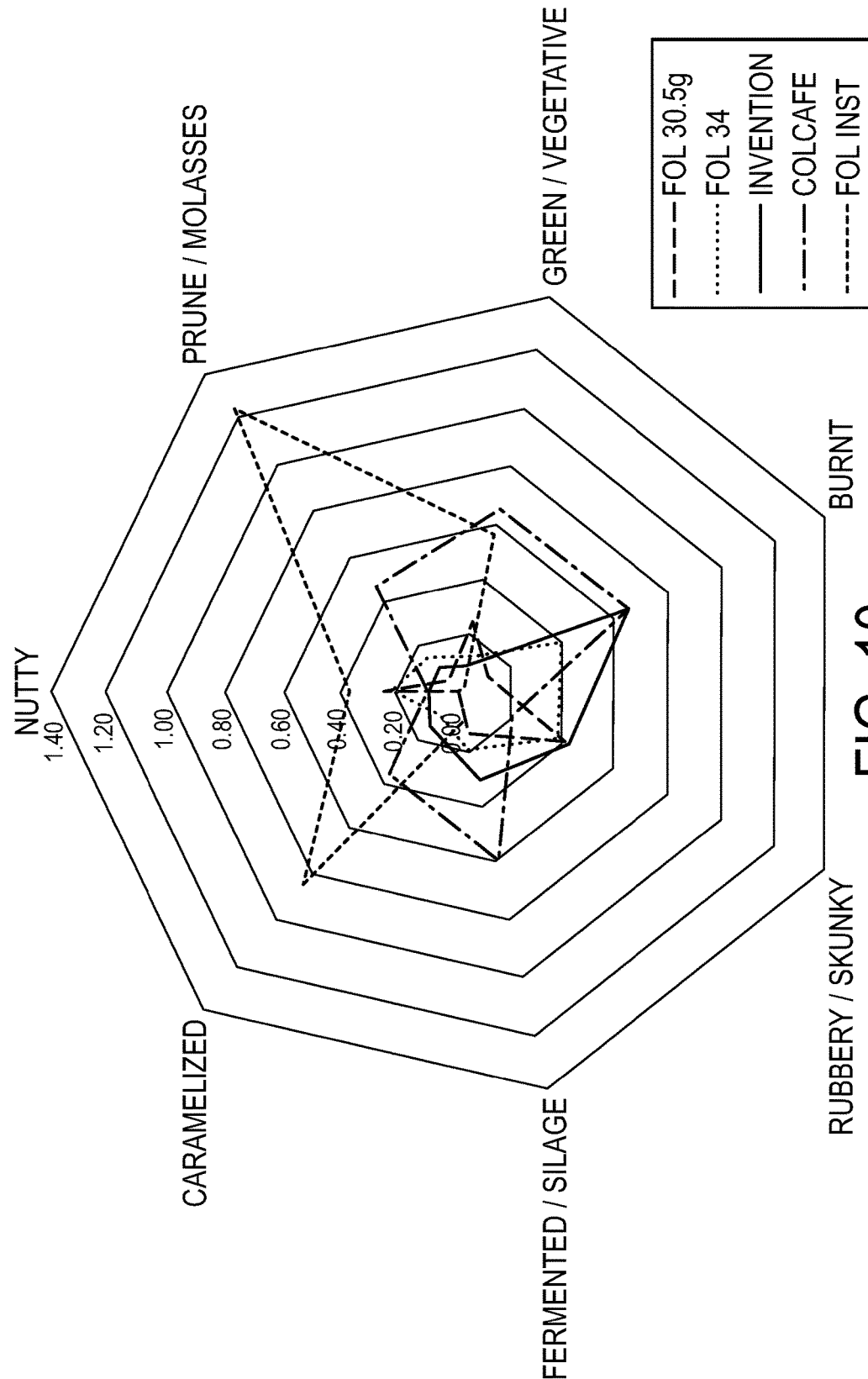
FIG. 10 is a graphical plot of low intensity attributes as measured by a sensory panel of various coffee compositions including a structured coffee composition.
Figure 11:
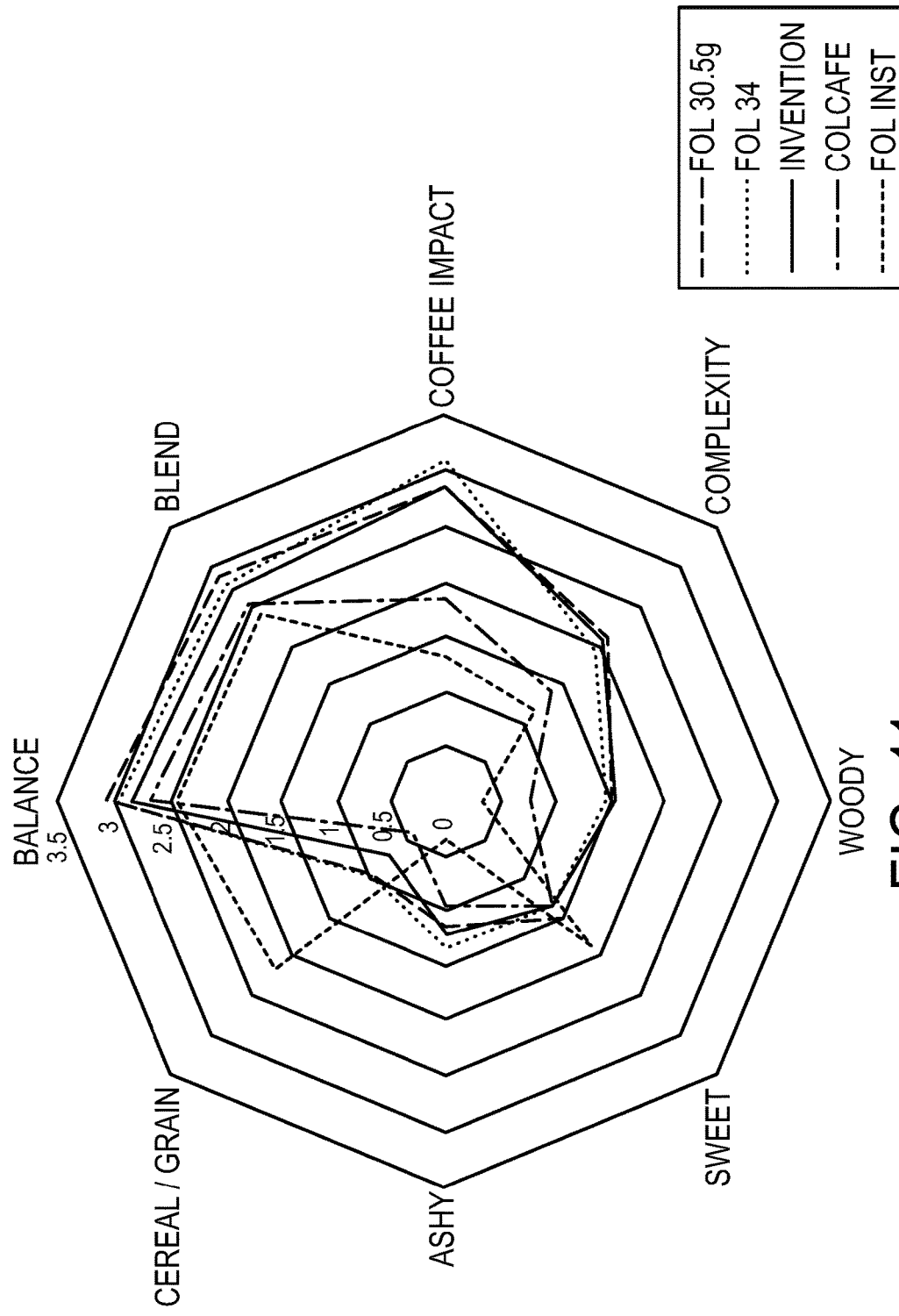
FIG. 11 is a graphical plot of moderate intensity attributes as measured by a sensory panel of various coffee compositions including a structured coffee composition.
Figure 12A:
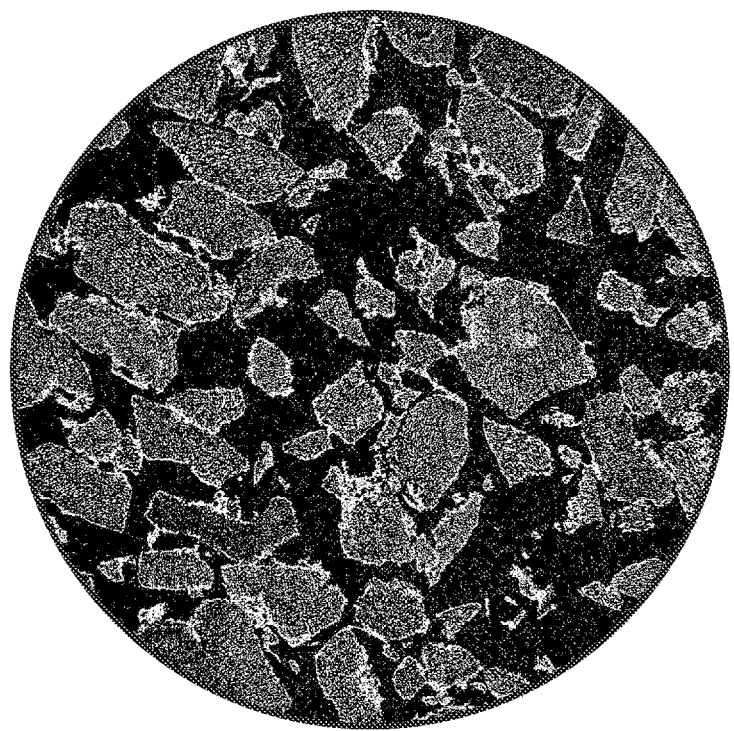
FIG. 12A is a cross section of a cylindrical molded product of one exemplary embodiment the structured coffee composition which depicts the Micro-CT of the porosity in a coffee product.
Figure 12B:
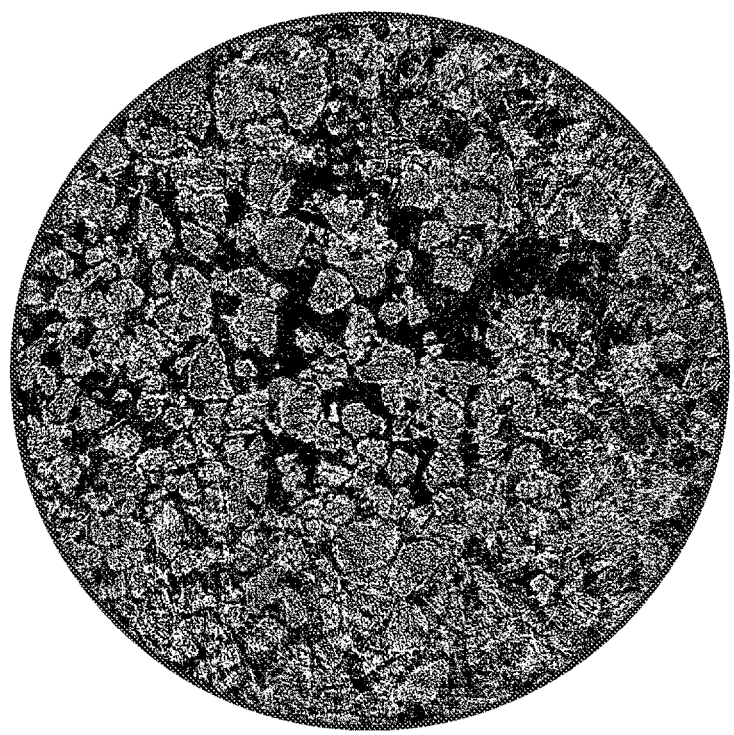
FIG. 12B is another cross section of a cylindrical molded product of another exemplary embodiment the structured coffee composition which depicts the Micro-CT of the porosity in a coffee product.
Figure 13A:
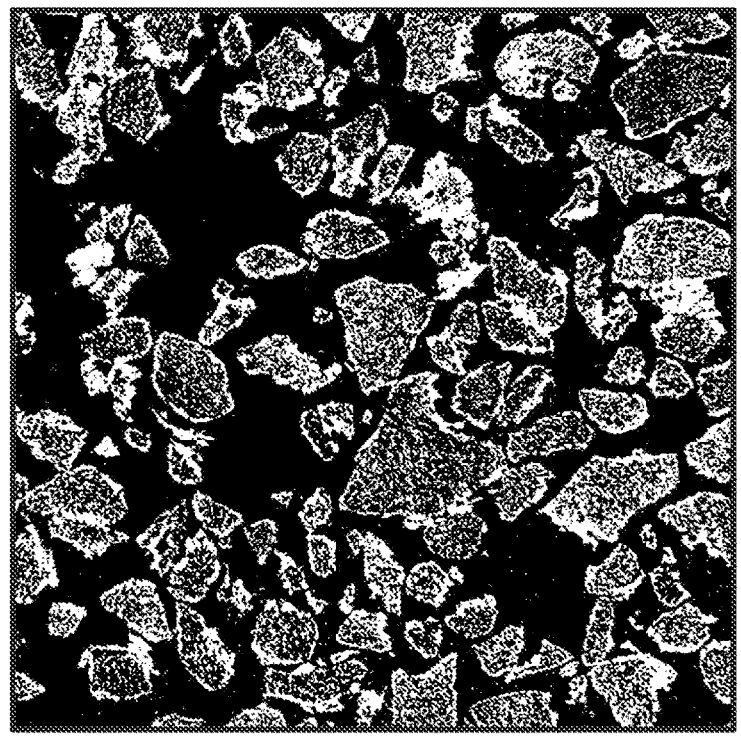
FIG. 13A is a cross section of a spherical molded product of one exemplary embodiment the structured coffee composition which depicts the Micro-CT of the porosity in a coffee product.
Figure 13B:
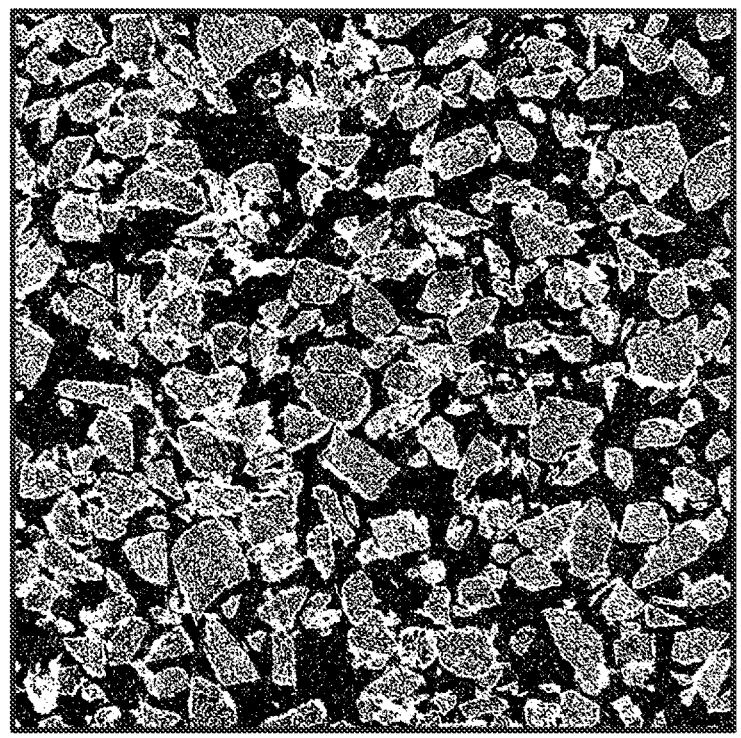
FIG. 13B is another cross section of a spherical molded product of another exemplary embodiment the present invention which depicts the Micro-CT of the porosity in a coffee product.

Sensory Panel Example: A sensory panel was conducted to position the present inventive coffee composition as compared to conventional roast and ground and instant coffee compositions. The follow list of coffee products were used to produce the various coffee brews tested by the panelists: (a) Folgers Classic Roast R&G at standard drop weight (30.5 grams) (FOL 30.5 grams); (b) Folgers Classic Roast R&G at drop weight matching present invention drop weight (34.0 grams) (FOL 34 grams); (c) Present Invention (4×8.5 gram structures)-80 percent Folgers Classic R&G+ 20 percent Colcafe Instant (Invention); (d) Folgers Instant Crystals (14.2 grams) (Fol Inst); and (e) Colcafe Instant (14.2 grams)-Low Yield High Quality Instant (Colcafe). All products were brewed in Mr. Coffee ADC brewers in 1420 mL H2O at a temperature of about 157° F.+/-1° F. The panels were run blind and randomized. These products were evaluated and compared over a number of different coffee flavor attributes. It was determined that the present invention had the most coffee "Body", such as heaviness, mouthfeel, consistency, and/or weight as it coated the tongue of the panelists. Further, Body, is the feeling of the consistency of the liquid related to the amount of extraction of the solids or any other additives that increase the viscosity (References: heaviness on tongue, fullness of mouthfeel). As shown in FIGS. 10 and 11, the present Invention most closely tracks the attributes of a conventional roast and ground coffee (both Folgers Classic roast and ground coffees) even with a mixture of instant coffee therein with the roast and ground.

The present disclosure has been described with reference to exemplary embodiments, it will be understood that it is not intended that the present invention be limited solely to such embodiments. Obviously, modifications and alterations will occur to others upon reading and understanding the preceding detailed description. In some embodiments of the invention, certain features of the invention can sometimes be used to advantage without a corresponding use of the other features. It is intended that the present disclosure be construed as including all such modifications and alterations insofar as they come within the scope of the appended claims or the equivalents thereof.

What is claimed is:
1. A structured coffee composition comprising:
   a plurality of ground roast coffee particles that each include an outer surface;
   a matrix of a first coffee extract that includes coffee solids from instant coffee and a second coffee extract that includes coffee solids, wherein the second coffee extract is extracted from the plurality of ground roast coffee particles; and wherein the matrix is on the outer surface of the ground roast coffee particles and binds the plurality of ground roast coffee particles together to form a compacted structure compacted to a compaction of 60% to 70%; and a filter paper pod encasing the compacted structure;

wherein a weight percent of the plurality of ground roast coffee particles is in the range of 65 wt % to 90 wt % based on of the total weight of the ground roast coffee particles and the coffee solids of the first coffee extract, and a weight percent of the first coffee extract is in the range of 10 wt % to 35 wt % based on the total weight of ground roast coffee particles and the coffee solids of the first coffee extract; and wherein the structured coffee composition has a hardness of from 21.3 N to 61.7 N over an axial direction of the structured coffee composition, a friability of 50% to 100%, and a water activity of 0.35 to 0.42; and wherein the structured coffee composition has a structural configuration like one of a cylinder, cube, cuboid, sphere, pellet, ellipsoid, triangular pyramid, hexagonal prism, truncated triangular pyramid, truncated square pyramid, hexagonal pyramid, truncated hexagonal pyramid, cone, truncated cone, diamond, a three dimensional shape with an oval-shaped face, a three dimensional shape with heart-shaped face, a three dimensional shape with triangle-shaped face, pillow shape, generally cylindrical shape, concave shape, convex shape, a shape with ridges, a shape with bumps, a shape with surface scoring, a shape with embossments, and a shape with a rounded face.

2. The structured coffee composition of claim 1, wherein the matrix is prepared by mixing instant coffee with water in a weight to weight ratio of instant coffee to solvent of 4:1 to 1:2 to form a solution of the first coffee extract;

mixing ground roast coffee particles and the solution of the first coffee extract until a sticky granulated composition is formed; thereby extracting the second coffee extract from the ground roast coffee particles forming a mixture of the first coffee extract and the second extract from the ground roast coffee particles in the granulated composition; and drying the granulated composition to form the matrix on the outer surface of the plurality of ground roast coffee particles.

3. The structured coffee composition of claim 1, wherein the matrix is prepared by mixing ground roast coffee particles and a liquid coffee concentrate comprising the first coffee extract until a sticky granulated composition is formed; thereby extracting the second extract from the ground roast coffee particles forming a mixture of the first coffee extract and the second coffee extract from the ground roast coffee particles in the granulated composition; and drying the granulated composition to form the matrix on the outer surface of the plurality of ground roast coffee particles.

4. The structured coffee composition of claim 1, wherein the matrix is a coating on the outer surface of the ground roast coffee particles and the coating on the ground roast coffee particles has an average surface area coverage in the range of 50 percent to 100 percent.

5. The structured coffee composition of claim 1, wherein the matrix is a coating on the outer surface of the ground roast coffee particles and the coating has a mean thickness in the range of 5 microns to 1500 microns.

6. The structured coffee composition of claim 1, wherein the coffee composition is free of non-coffee binders.

7. The structured coffee composition of claim 1, wherein an 8.5 gram to a 12.5 gram structured coffee composition yields brew solids in the range of 0.90 weight percent to 3.00 weight percent in a standard serving of brewed coffee.

8. The structured coffee composition of claim 1, wherein the structured coffee composition readily disintegrates when contacted with brewing water for a brewing cycle.

9. The structured coffee composition of claim 1, wherein the structured coffee composition is spherical.

10. The structured coffee composition of claim 1, wherein the structured coffee composition is cylindrical.

11. The structured coffee composition of claim 1, wherein four 8.5 gram structured coffee compositions extract in 1700 milliliters of cold water at 38.7 to 42.3° F. in 2 to 4 hours for cold brew coffee with a percent brew solids of 1.0 to 1.5.

12. The structured coffee composition of claim 3:

wherein the matrix is a coating on the outer surface of the ground roast coffee particles and the coating on the ground roast coffee particles has an average surface area coverage in the range of 50 percent to 100 percent, wherein the matrix is a coating on the outer surface of the ground roast coffee particles and the coating has a mean thickness in the range of 5 microns to 1500 microns, wherein the coffee composition is free of non-coffee binders, and wherein the structured coffee composition readily disintegrates when contacted with brewing water for a brewing cycle.

13. The structured coffee composition of claim 12, wherein four 8.5 gram structured coffee compositions extract in 1700 milliliters of cold water at 38.7 to 42.3° F. in 2 to 4 hours for cold brew coffee with a percent brew solids of 1.0 to 1.5.

14. A structured coffee composition comprising:

a plurality of ground roast coffee particles that each include an outer surface;

a matrix of a first coffee extract that includes coffee solids from instant coffee and a second coffee extract that includes coffee solids, wherein the second coffee extract is extracted from the plurality of ground roast coffee particles; and wherein the matrix is on the outer surface of the ground roast coffee particles and binds the plurality of ground roast coffee particles together to form a compacted structure compacted to a compaction of 60% to 70%;

a filter paper pod encasing the compacted structure;

wherein a weight percent of the plurality of ground roast coffee particles is in the range of 65 wt % to 90 wt % based on the total weight of the ground roast coffee particles and the coffee solids of the first coffee extract, and a weight percent of the first coffee extract is in the range of 17.5 wt % to 35 wt % based on the total weight of ground roast coffee particles and the coffee solids of the first coffee extract.

15. The structured coffee composition of claim 14, wherein the matrix is prepared by mixing instant coffee with water in a weight to weight ratio of instant coffee to solvent of 4:1 to 1:2 to form a solution of the first coffee extract;

mixing ground roast coffee particles and the solution of the first coffee extract until a sticky granulated composition is formed; thereby extracting the second coffee extract from the ground roast coffee particles forming a mixture of the first coffee extract and the second extract from the ground roast coffee particles in the granulated composition; and drying the granulated composition to form the matrix on the outer surface of the plurality of ground roast coffee particles.

16. The structured coffee composition of claim 14, wherein the matrix is prepared by mixing ground roast coffee particles and a liquid coffee concentrate comprising the first coffee extract until a sticky granulated composition is formed; thereby extracting the second extract from the ground roast coffee particles forming a mixture of the first coffee extract and the second coffee extract from the ground roast coffee particles in the granulated composition; and drying the granulated composition to form the matrix on the outer surface of the plurality of ground roast coffee particles.

17. The structured coffee composition of claim 14, wherein the matrix is a coating on the outer surface of the ground roast coffee particles and the coating on the ground roast coffee particles has an average surface area coverage in the range of 50 percent to 100 percent.

18. The structured coffee composition of claim 14, wherein the matrix is a coating on the outer surface of the ground roast coffee particles and the coating has a mean thickness in the range of 5 microns to 1500 microns.

19. The structured coffee composition of claim 14, wherein the coffee composition is free of non-coffee binders.

20. The structured coffee composition of claim 14, wherein an 8.5 gram to a 12.5 gram structured coffee composition yields brew solids in the range of 0.90 weight percent to 3.00 weight percent in a standard serving of brewed coffee.

21. The structured coffee composition of claim 14, wherein the structured coffee composition exhibits a water activity of 0.35 to 0.42.

22. The structured coffee composition of claim 14, wherein the structured coffee composition readily disintegrates when contacted with brewing water for a brewing cycle.

23. The structured coffee composition of claim 14, wherein four 8.5 gram structured coffee compositions extract in 1700 milliliters of cold water at 38.7 to 42.3° F. in 2 to 4 hours for cold brew coffee with a percent brew solids of 1.0 to 1.5.

24. The structured coffee composition of claim 14:

wherein the matrix is a coating on the outer surface of the ground roast coffee particles and the coating on the ground roast coffee particles has an average surface area coverage in the range of 50 percent to 100 percent, wherein the matrix is a coating on the outer surface of the ground roast coffee particles and the coating has a mean thickness in the range of 5 microns to 1500 microns, wherein the coffee composition is free of non-coffee binders, and wherein the structured coffee composition exhibits a water activity of 0.35 to 0.42, and wherein the structured coffee composition readily disintegrates when contacted with brewing water for a brewing cycle.

25. The structured coffee composition of claim 24, wherein four 8.5 gram structured coffee compositions extract in 1700 milliliters of cold water at 38.7 to 42.3° F. in 2 to 4 hours for cold brew coffee with a percent brew solids of 1.0 to 1.5.

\* \* \* \* \*